US007690566B2

(12) United States Patent
Quine et al.

(10) Patent No.: US 7,690,566 B2
(45) Date of Patent: Apr. 6, 2010

(54) INTEGRATED BALLOT AND VOTING ENVELOPE WITH VOTER VERIFICATION SECURITY

(75) Inventors: Douglas B. Quine, Bethel, CT (US); Bertrand Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 749 days.

(21) Appl. No.: 11/514,049

(22) Filed: Aug. 31, 2006

(65) Prior Publication Data

US 2008/0054074 A1 Mar. 6, 2008

(51) Int. Cl.
*G06K 17/00* (2006.01)
*G07C 13/00* (2006.01)

(52) U.S. Cl. .......................... 235/386; 235/487; 705/12

(58) Field of Classification Search ................ 235/386, 235/51, 487, 491, 5; 705/12; 283/5; 28/5
See application file for complete search history.

(56) References Cited

U.S. PATENT DOCUMENTS 3,995,808 A 12/1976 Kehoe ......................... 229/73
5,048,748 A 9/1991 Martin et al. .............. 229/92.1
5,192,389 A 3/1993 Martin ....................... 156/364
2005/0061866 A1* 3/2005 Ackley et al. ............... 229/306
2006/0138768 A1* 6/2006 Abaygar et al. ............. 283/106

FOREIGN PATENT DOCUMENTS

DE 35 11 529 A1 10/1986
EP 0 587 315 A1 3/1994
FR 2 750 644 A1 1/1998
GB 2396328 A * 6/2004
NL 1 015 881 C1 2/2002

* cited by examiner

*Primary Examiner*—Edwyn Labaze
(74) *Attorney, Agent, or Firm*—George M. Madonald; Angelo N. Chaclas

(57) ABSTRACT

A method and form for an integrated voting system includes a single sheet having ballot information, verification information and mailing information thereon. The sheet is folded to form various panels including a first and a second panel having ballot information thereon. Sealing means is provided on one of the first and second panels and located to obscure the ballot information from view when used seal the first and the second panels. A verification panel is attached to the first and said second ballot panels to provide for verification. A first mailing panel is attached to one of the first and the second ballot panel and said verification panel to form an outer mailing envelope such that the ballot panels and verification panel can be mailed to a voting authority for processing. The panels may be of different heights to facilitate processing by a voting authority.

21 Claims, 27 Drawing Sheets

INTEGRATED BALLOT AND VOTING ENVELOPE WITH VOTER VERIFICATION SECURITY

FIELD OF THE INVENTION

The present invention relates generally to voting systems and, and more particularly, to an integrated ballot and voting envelope which may also provide voter verification security.

BACKGROUND OF THE INVENTION

Voting by mail is becoming increasingly popular as mobile and multi-tasking citizens find it difficult or inconvenient to appear at the polling station within the designated hours. Some states, such as Oregon, have even adopted voting by mail as the standard system. Maintaining both the integrity and the privacy of the voting process requires that two competing factors be resolved. First, it is essential to ensure that the counted votes are from legitimate voters and that they have voted only once. Secondly, to ensure privacy, it is essential to ensure that identity of the voter is not matched to their ballot. Absentee ballots must also be scaleable for elections in which multiple candidates or referendum questions cause the ballot to become long.

A typical solution used for absentee ballots in a nearby town is a three-part system. An anonymous ballot (A) is completed by the voter and sealed in a signed inner envelope (B). The sealed signed inner envelope (B) is placed within an outer mailing envelope (C) that is mailed to the appropriate entity such as a board of election. At the time of the ballot count, the outer envelopes (C) are opened and the signatures on the inner envelopes (B) are compared with the registered voter's signature on record. If they match, and if only one ballot is received from that voter within the designated time period, for example, by the end of the voting day, then the ballot (A) is removed from the inner envelope (B) and placed in an anonymous stack of ballots that have been verified or determined as legitimate for counting. In this manner the legitimacy of the votes is determined first and the private votes are subsequently tabulated. If the signature on the inner envelope (B) does not match the town records, however, the inner envelope (B) containing the sealed ballot (A) is set aside for further review. Since the ballot should be anonymous, the inner envelope remains sealed to maintain the association of the signature with the secret ballot.

There are many problems with the above-described traditional approach to voting. The voting process may be confusing to the inexperienced voter. While the voting packet is typically accompanied by instructional information, people may inappropriately sign the outer envelope, may forget to use the inner envelope, or may forget to sign the inner envelope. These errors may jeopardize their privacy and even the acceptance of their vote. Further, the assembly of the ballots is a complex process because the ballots, instructions, and envelopes must all be packaged into a packet of materials for each voter. In towns or jurisdictions with multiple districts or elections with multiple local referendum issues there may be many versions of the ballots which must be created, collated, and maintained in inventory for voters from each district. The process is also difficult to automate for high volume voting. Although absentee ballots may be processed manually, when large numbers of voters, such as an entire state, vote by mail and when answers are sought quickly and cheaply, problems can arise with timeliness of completing the vote counting process, cost and even accuracy.

This absentee ballot implementation also means that the person opening envelope B has an opportunity to associate the signature with the ballot, which means that the vote is no longer secret. An alternative embodiment in which four parts are used: ballot (A), inner anonymous sealer envelope (B), signed middle envelope (C), and outer mailing envelope (D) allows for the ballots to be separated from the signature envelope while remaining anonymous. This design, however, further complicates the voting process and also increases the labor associated with validating and counting the ballots because of the added envelope to open.

If instead the signature is placed on the mailing envelope, the voter's signature, mailing address and the voter's return address may be visible as the ballot passes through the mail. This poses a clear threat of identity theft if the envelope with signature and voter's return address is photographed, scanned or copied. Moreover, various jurisdictions, such as the State of Washington, have mandated that the voter signature be hidden from view on mailed absentee ballots. Flaps covering the signature panel to resolve the privacy issue without adding another envelope have been utilized to hide the signature but they are labor intensive to remove and the process is difficult to automate. The processing of such ballots can therefore be slow and expensive. This type of problem has been addressed, for example, in the system in U.S. patent application Ser. No. 11/262,616 for VOTE BY MAIL ENVELOPE filed Oct. 31, 2005, in the names of Bertrand Haas and Denis Stemmle and assigned to Pitney Bowes Inc. The application discloses a ballot envelope that covers the signature but allows reading of the signature through the flap without opening or with simplified opening.

These traditional forms of absentee voting with ballot, inner envelope, outer envelope and private absentee ballots with ballot, inner envelope, outer envelope with flap covering signature, have been processed by employing opening equipment such as grinding devices to cut off the edges of envelopes for automated opening or cutting blades or wheels to slide off the bottoms of envelopes for automated opening. Such type of devices and opening systems are employed for example in opening bill payments. The ballots themselves may be prepared similar to the continuous printing of W2 tax forms as required by the US Internal Revenue Service. That is, the ballot can be formed and printed using an internal piece of carbon or similar type paper.

SUMMARY OF THE INVENTION

It is an object of the present invention to provide a ballot and envelope arrangement that over comes or minimizes the types of problems and complexity associated with separate envelopes and ballots.

It is another object of the present invention to provide a ballot and voting envelope where the envelope can be removed or opened without damage to the ballot.

It is yet another object of the present invention to provide a ballot and voting envelope where the privacy of the ballot is protected.

It has been discovered that a single sheet can be folded in a particular manner with varying panel sizes to place information thereon to form a ballot, a verification portion and a mailing envelope such that cutting or opening the top and bottom of the mailing envelope would release the envelope with no cutting within the ballot or verification portion. The ballot, verification portion and envelope may be formed with different heights to protect against damage to the ballot and verification portion when the envelope is opened and also when the verification portion is removed from the ballot. A double seal may also be employed so that removal of the envelope and subsequently the verification process do not open the inner sealed ballot.

The single piece ballot, verification portion and mailing envelope of the present invention simplifies the ballot creation and voting process. It facilitates automated signature and/or other verification checking, and the separation of the signature and/or verification portion from the ballot. The integrated ballot and voting envelope with signature and/or other verification portion is also amenable to bar or other type coding for ballot identification to provide inventory control of various ballot types and for voter identity checking on completed ballots while also ensuring that privacy is maintained. Additionally, the integrated ballot and voting envelope with signature and/or other verification portion may be printed on continuous roll paper and comprises three portions; a ballot, signature and/or other verification portion, and a mailing envelope portion that may have an integrated flap. The mailing envelope portion with an integrated flap allows the voter to return the completed ballot and verification portion to the voting authority for processing. Fold line weakening, such as die cutouts or perforations, can be provided and ballot identification panels or customized designs can also be added. The design requires less paper than current absentee ballots and is readily scaleable for long ballots (e.g. ballots with many candidates or referendum issues). Moreover, the folding pattern of the envelope makes it easily opened by automation equipment. Inner panels may be folded to be of a smaller height than outer panels such that cutting away the front outer panel does not open inner panels such as an inner verification panel or ballot panel(s).

The present invention, employing a one-piece form, folds to form a mailing envelope containing a ballot and verification panel which simplifies the voting process, particularly for inexperienced voters. It reduces the need for extensive confusing instructions and helps to reduce the number of invalid ballots.

The present invention conserves resources by reducing paper use and instructional documentation overhead while helping to speed up the voting process. Aspects of the invention employing different height panels simplify the vote processing by creating a wide tolerance cutting area to open the ballot. This is especially useful in voting situations where a high volume of ballots must be processed.

In accordance with another aspect of the present invention, the verification of the ballot, such as a voter's signature, is hidden behind an opaque security panel to provide enhanced security and meet jurisdictional requirements. The ballot creation is a simple printing process which may be two-sided and, if desired, pre-folded before mailing to the voter. The present invention minimizes or even eliminates the need for additional parts and collations. Because internal folds cause the inner paper panels to be of a smaller height than the outer panels, when the folds are cut off, the inner panels remain intact and are less likely to be mutilated. In accordance with still another aspect of the present invention, optional fold weakening, such as by cut out tabs or perforations, allow for easy panel separation and removal, such as by cutting, tearing or grinding and thereafter removal such as by a vacuum or diverter removal process. Additionally, various embodiments reduce the number of panels and, thus, the amount of paper required to implement the voting process.

An integrated voting system form embodying the present invention includes a single sheet having ballot information, verification information and mailing information thereon. The sheet is folded to form various panels including a first and a second panel available for ballot information. Sealing means are provided on one of the first and second panels and located to obscure the ballot information from view when used seal the first and the second panels. A verification panel is attached to the first and said second ballot panels to provide for verification information relating to the ballot. One of a first and second mailing panel is attached to one of the first and the second ballot panel and said verification panel to form an outer mailing envelope such that the ballot panels and verification panel can be mailed to a voting authority for processing.

In accordance with an aspect of the present invention the integrated voting system form ballot panels are of a smaller height than the verification panel and the verification panel is of a smaller height than the mailing panels.

A method of preparing an integrated voting system form embodying the present invention includes the steps of providing information on a single sheet, the information containing ballot information, verification information and mailing information. Folding the sheet to form a first and a second panel having ballot information printed thereon. Providing a sealing means on one of the first and second ballot panels and positioning the sealing means such the ballot information on the first and the second ballot panels is obscured from view when sealing the first and the second folded ballot panels with the sealing means. Folding the sheet to form a panel having verification information thereon attached by a fold line to one of the first and the second ballot panels to provide verification information relating to a ballot. Folding the sheet to form first and second mailing panels with one of the mailing panels attached by a fold line to one of the first and second ballot panels and the verification panel and such that the ballot panels and the verification panel can be mailed to a voting authority for processing.

In accordance with an aspect of the present invention, the method of preparing an integrated voting system form includes forming the ballot panels to be of a smaller height than the verification panel and forming the verification panel to be of a smaller height than the mailing panels.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts in the various figures.

DETAILED DESCRIPTION OF THE PREFERRED EMBODIMENT

Figure 1A:
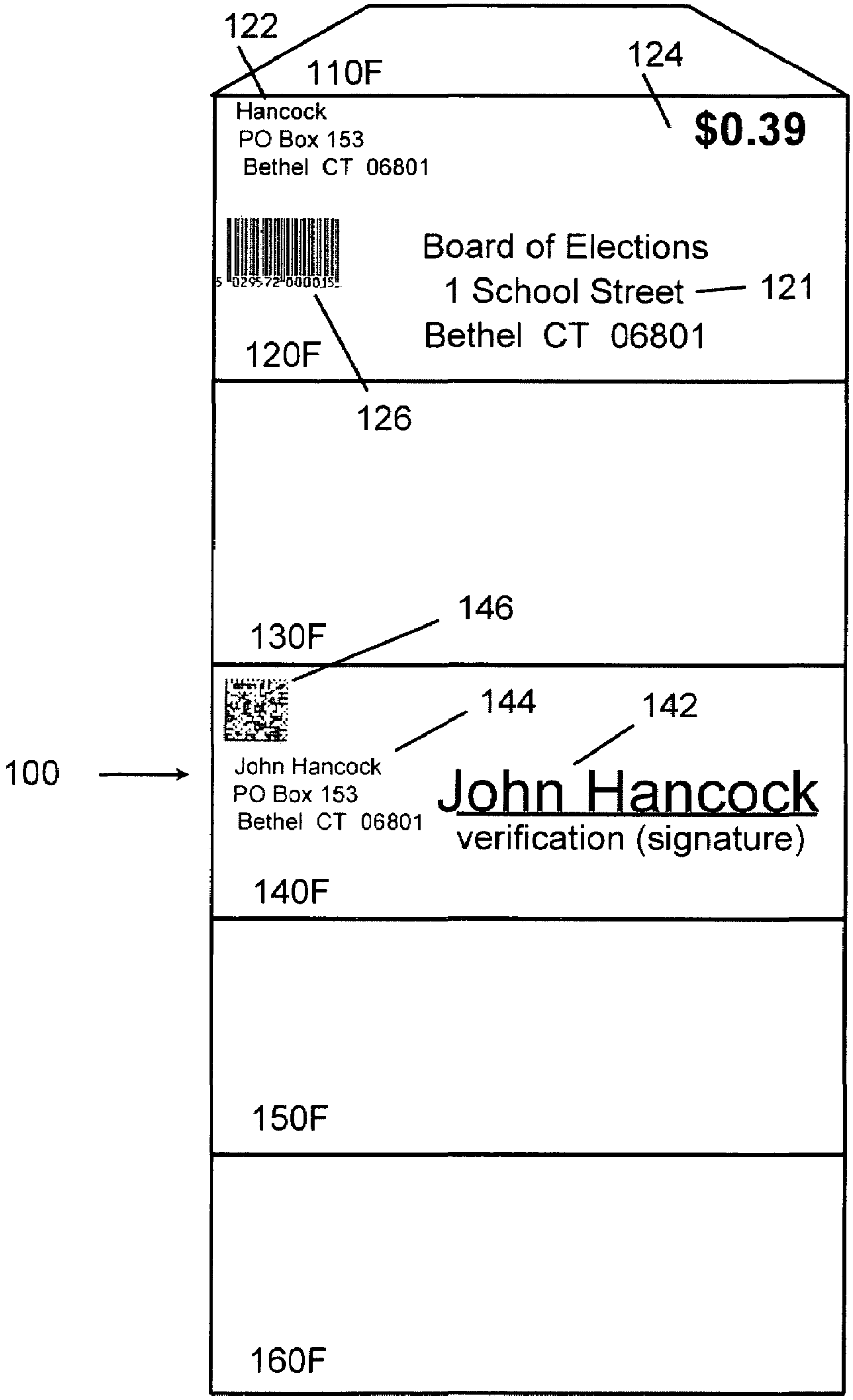
FIG. 1*a* is a front view of an integrated ballot and voting envelope with voter verification security embodying the present invention.

In the various figures the same reference numeral with an F denotes the front of a panel or flap and a B denotes the back of the same panel or flap. The number alone without the letters F or B refers to the entire panel, front and back. All of the internal horizontal lines shown in the various figures between panels or flaps are fold lines where the portions of the integrated ballot and voting envelope with voter verification security are to be folded.

Figure 1B:
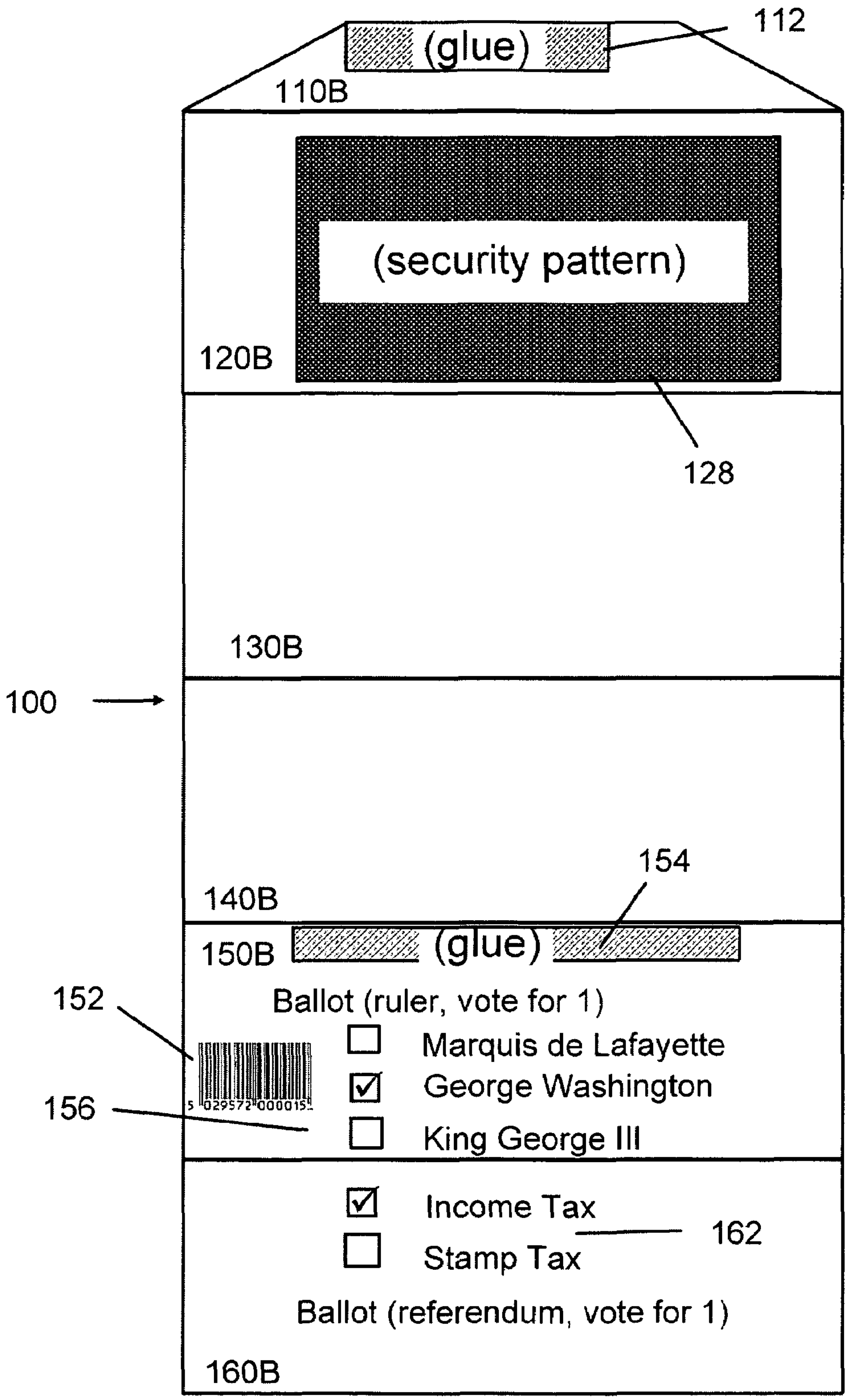
FIG. 1*b* is a back view of the integrated ballot and voting envelope with voter verification security shown in FIG. 1*a* embodying the present invention.

Reference is now made to FIGS. 1*a* and 1*b*. An integrated ballot and voting envelope with voter verification security 100, hereinafter referred to as an integrated voting system, includes a front side shown in FIG. 1*a* and a back side shown in FIG. 1*b*. Printed information of the type shown such as the ballot information, voter verification information, address information, and the like is printed on the front and back panels of the integrated voting system 100. The integrated voting system 100 is a single integrated form (sheet) adapted to have a number of folds in a roll-fold configuration. The front of the ballot shown in FIG. 1*a* includes a flap 110F that has a glue line 112 on the flap back reverse side 110B. Panel 120F is a first part of a voter envelope for the integrated voting system 100. The address 121 on panel 120F is directed to a voting authority responsible for receiving voter ballots, here shown as the Board of Elections. A voter or other return address 122 and a suitable payment or permit postage block 124 may also be included on panel 120F. Since numerous, different types of ballots may be received by the voting authority, a barcode 126 may be included indicating the specific election or ballot involved. Panel 120B includes a security pattern 128. The security pattern is provided to help obscure the verification panel 140F from view or scrutiny when the envelope and ballot are fully folded and sealed. Any suitable pattern or technique for obscuring the verification panel can be employed.

Panel 130F, when the integrated voter system 100 is roll-folded, provides a second part for the voter mailing envelope.

Thus, panels 120F and 130F sealed by flap 110 provide the outer enclosure for the verification panel 140F and ballot 150B and 160B, for return to the voting authority 121, the Board of Elections. The panel 130B is the inside of the outer mailing envelope panel 130F and can be used for any purpose, for example, printed instructions from the voting authority concerning the ballot.

A verification panel 140F is provided as part of the ballot for verification of the voter. The verification 142 can be a signature as shown, or can be a biometric verification, such as a thumbprint, or other form(s) of voter identification and verification. These other forms of verification can include a secret code or a digital signature. The verification panel may also include a human-readable identification of the voter, such as that shown at 144, and a barcode-readable identification of the voter, as shown at 146. The barcode shown at 146 can be any suitable form of barcode or other code which is machine-readable and can be utilized to call up the voter's signature or other verification for manual or machine comparison to verify that the ballot is submitted by an appropriate voter.

The ballot itself is provided on panels 150B and 160B. The ballot may be any form of suitable ballot, for example, for individuals, for specific offices, referendum issues, and the like. The ballot panel 150B may also include a barcode 152 that identifies the specific election or ballot involved and could correspond to barcode 126. A further similar barcode, if desired, can be placed on panel 160B where further processing may separate panel 160B from panel 150B. The size of the ballot is determined, in part, by the amount of ballot information needed to be provided to the voter. Additional panels may be included in (appended to) the integrated voting system form if a particular election requires extensive choices (such as the California gubernatorial recall election on Oct. 7, 2003 with 135 candidates).

A sealing means such as glue line 154 is provided so that the ballot 150B and 160B can be folded and sealed for security purposes. Panels 130F, 130B, 140B, 150F and 160F contain no printed information. These panels, 130F, 140B, 150F and 160F, similar to panel 130B noted above, are available for various instructional or other types of information to be included as part of the integrated voting system 100. The ballot panel 150B may include a ballot portion 156 and the ballot panel 160B may include a ballot portion 162. The ballot portion 156 on panel 150B and the ballot portion 162 on panel 160B may be human-readable and/or machine-readable and also in various different formats that are implemented in balloting.

Figure 2:
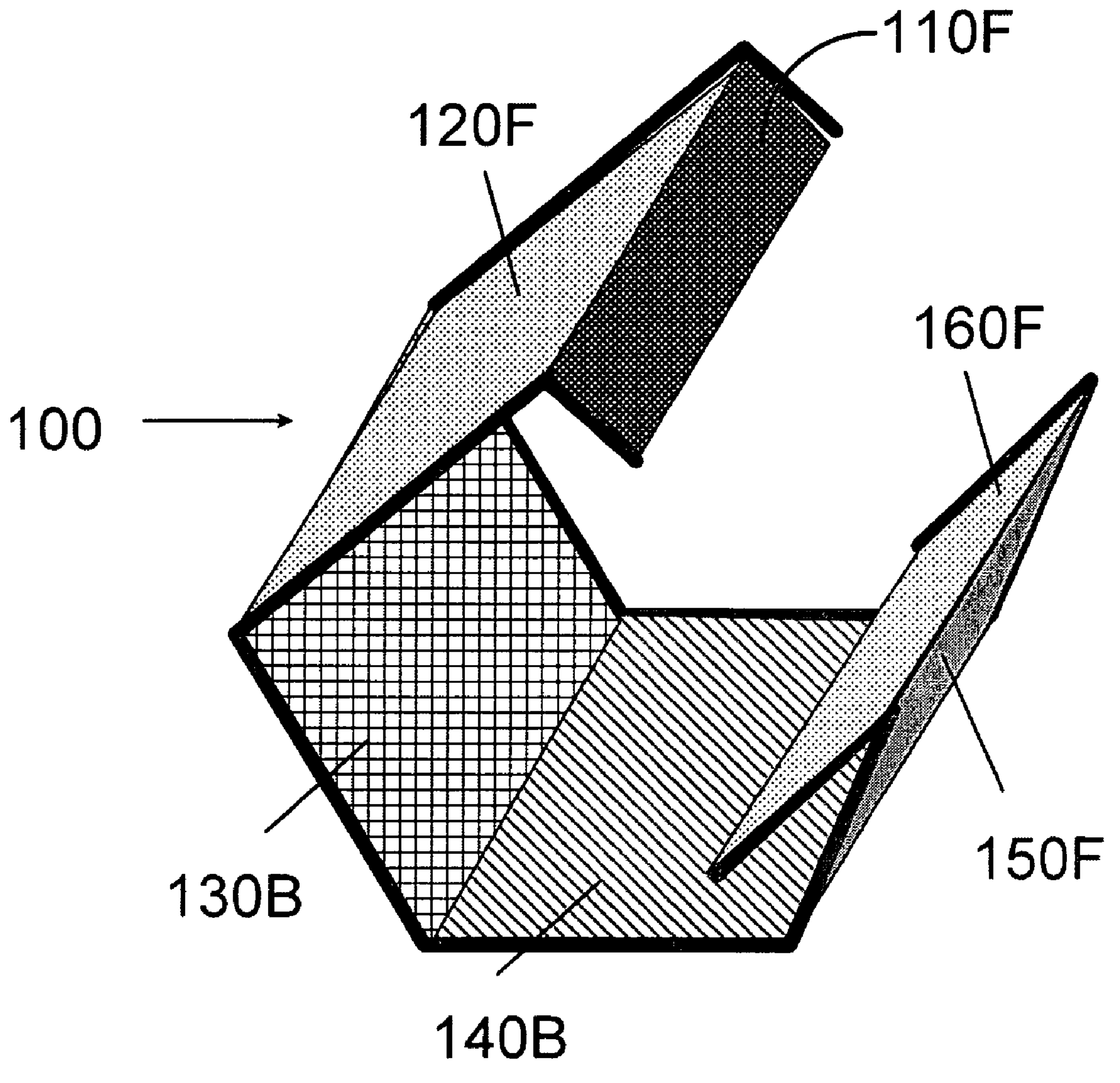
FIG. 2 is a perspective view of a partially roll-folded integrated ballot and voting envelope with voter verification security shown in FIGS. 1*a* and 1*b;*
Figure 3:
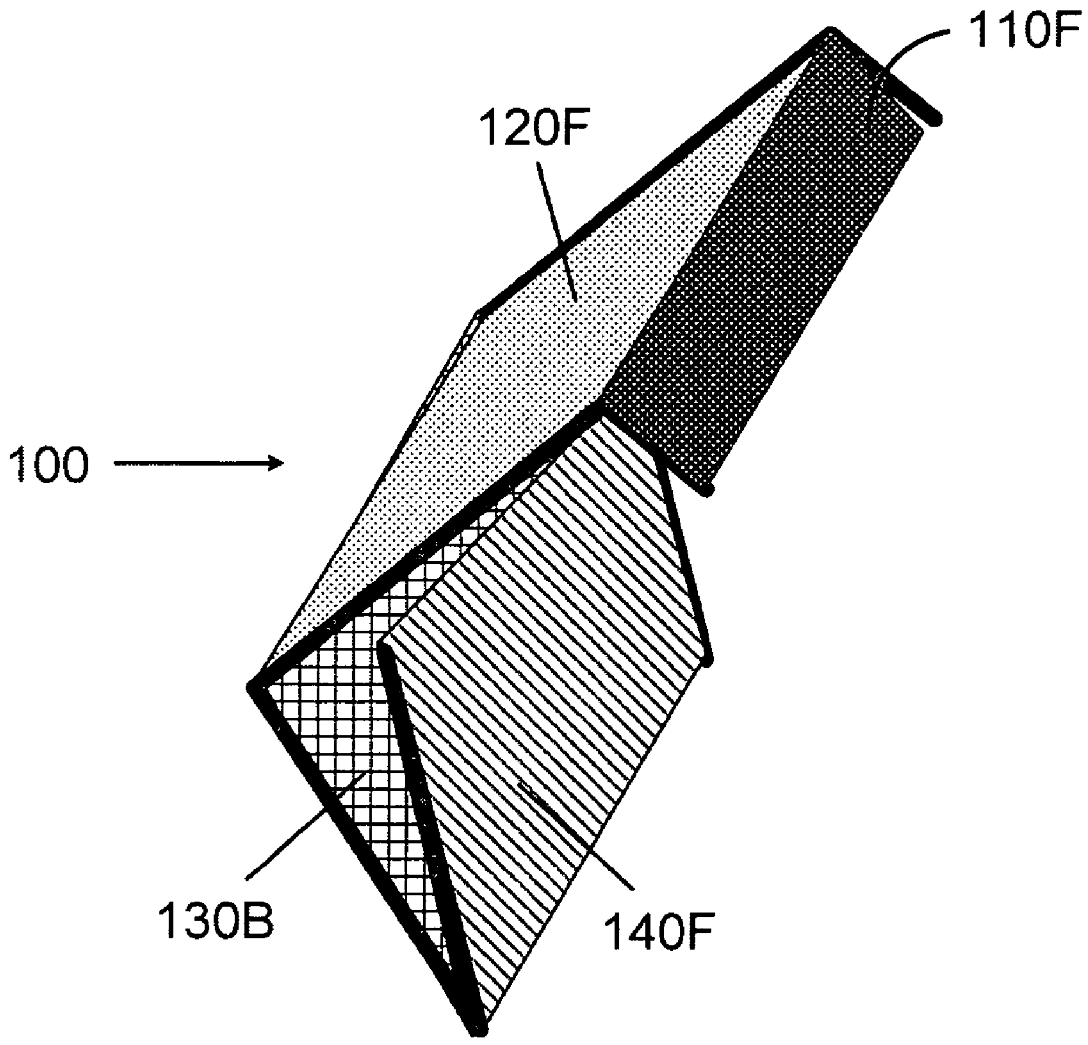
FIG. 3 is a perspective view of a more fully roll-folded integrated ballot and voting envelope with voter verification security shown in FIGS. 1*a* and 1*b;*

Reference is now made to FIG. 2 and FIG. 3. As the integrated voting system 100 is roll-folded, the nesting of the various panels, one upon the other, is shown in FIG. 2 and more fully folded in FIG. 3. As the ballot is closed, the panel 160B is sealed to the panel 150B by the virtue of the glue line 154 shown in FIG. 1*b*. As the ballot continues to be folded, the glue line at 112 on panel 110B shown in FIG. 1*b* is adhered to panel 130F close to the fold line between panel 130F and the verification panel 140F.

Figure 4A:
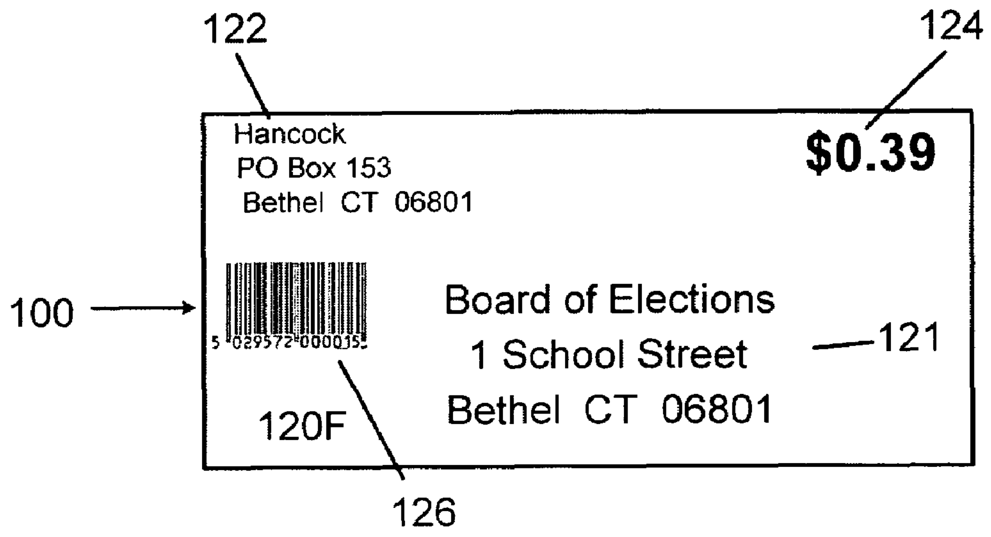
FIG. 4*a* is a front view of a fully roll-folded and sealed integrated ballot and voting envelope with voter verification security shown in FIGS. 1*a* and 1*b*
Figure 4B:
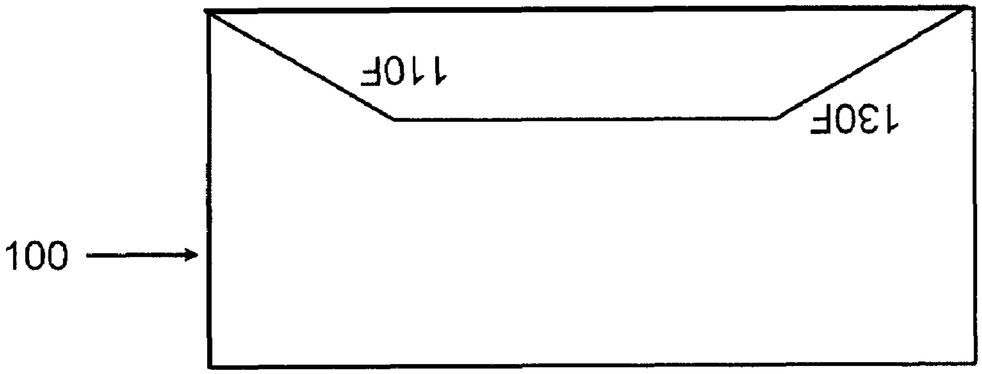
FIG. 4*b* is a back view of a fully roll-folded and sealed integrated ballot and voting envelope with voter verification security shown in FIGS. 1*a* and 1*b*

Reference is now made to FIGS. 4*a* and 4*b*. These figures show the front and back of the fully folded and sealed integrated voting system 100. It should be noted that the ballot and verification panel are enclosed by panels 120F and 130F and as shown in FIGS. 1*a* and 1*b*, these panels 120 and 130 are of a greater height than the inner panels 140, 150 and 160. Moreover, panel 140 is of a greater height than panels 150 and 160. Panel height is the vertical length of a panel as viewed in the front and back views of the various figures. For example, height of panel 120 is the vertical distance between the horizontal fold line between flap 110 and panel 120 and the horizontal fold line between panel 120 and panel 130. This ensures that during further processing of the integrated voting system 100 as shown in FIGS. 5, 6, 7*a*, 7*b*, and 7*c*, the verification panel 140F and the ballot panels 150B and 160B are not mutilated, which could preclude proper processing of the ballot. Height may be added, beyond that required to allow the pieces to roll fold together, to provide a margin of error in the subsequent cutting operations. If the ballot processing system is capable of very accurately and precisely controlling the movement of the incoming ballots then this additional increment may be small. If the positioning of the ballots in the processing system is imprecise, then additional height of these panels provides a margin of safety for the internal sealed ballot. As one example, the height difference may be about 2 millimeters (mm) where no glue line is involved and about 2 mm plus the glue line width where a glue line is to be cut off (such as panel 150B).

Figure 5:
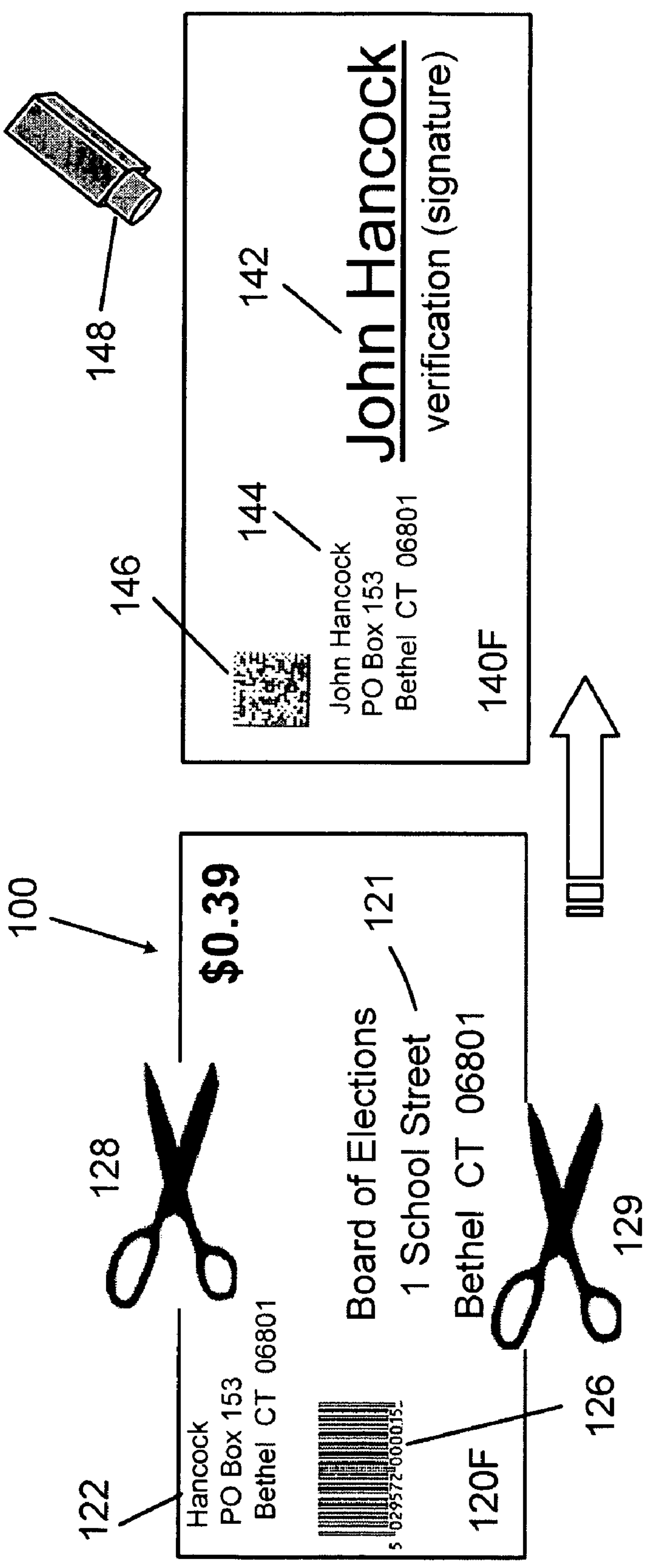
FIG. 5 is a diagrammatic representation of the process of opening the fully roll folded and sealed integrated ballot and voting envelope with voter verification security shown in FIGS. 4*a* and 4*b* to reveal the verification panel.

Reference is now made to FIG. 5. The integrated voting system 100 has been received by the voting authorities and is to be processed. The top and bottom of the panel 120 are cut open, as denoted by the scissors 128 and 129. The cutting can be manual, or can be automated, such as by grinding, cutting or slitting. The cutting of the top and bottom of the panel 120 allows removal of panel 120 to reveal the verification panel 140F as shown. The verification panel 140F is still attached and integral with the inner sealed ballot 150B and 160B.

When panel 120 is cut, the panel can be removed to reveal the verification panel 140F through any suitable processing technique. If desired, a glue line can be added to panel 150B close to the crease line with panel 140 so that the end of panel 130 can be glued to panel 150. This would avoid, where desired, panel 130 being attached to panel 140 and the other end being loose. Examples of removal processing techniques are vacuum pick-off, friction pick-off or diverter-type arrangements. With the verification panel 140F exposed, the voter verification process can be implemented through an automated or manual process. A camera system 148 may image the verification block 142 or process the block. If it is, for example, a thumbprint and/or a signature, the verification process can verify that the voter verification, scanned thumbprint and/or signature corresponds to a retrieved thumbprint and/or signature for the voter based on the information provided in the human-readable form at 144 and/or machine-readable form at 146. Various types of camera systems may be employed to image or scan one or both sides of a document to capture information.

Figure 6:
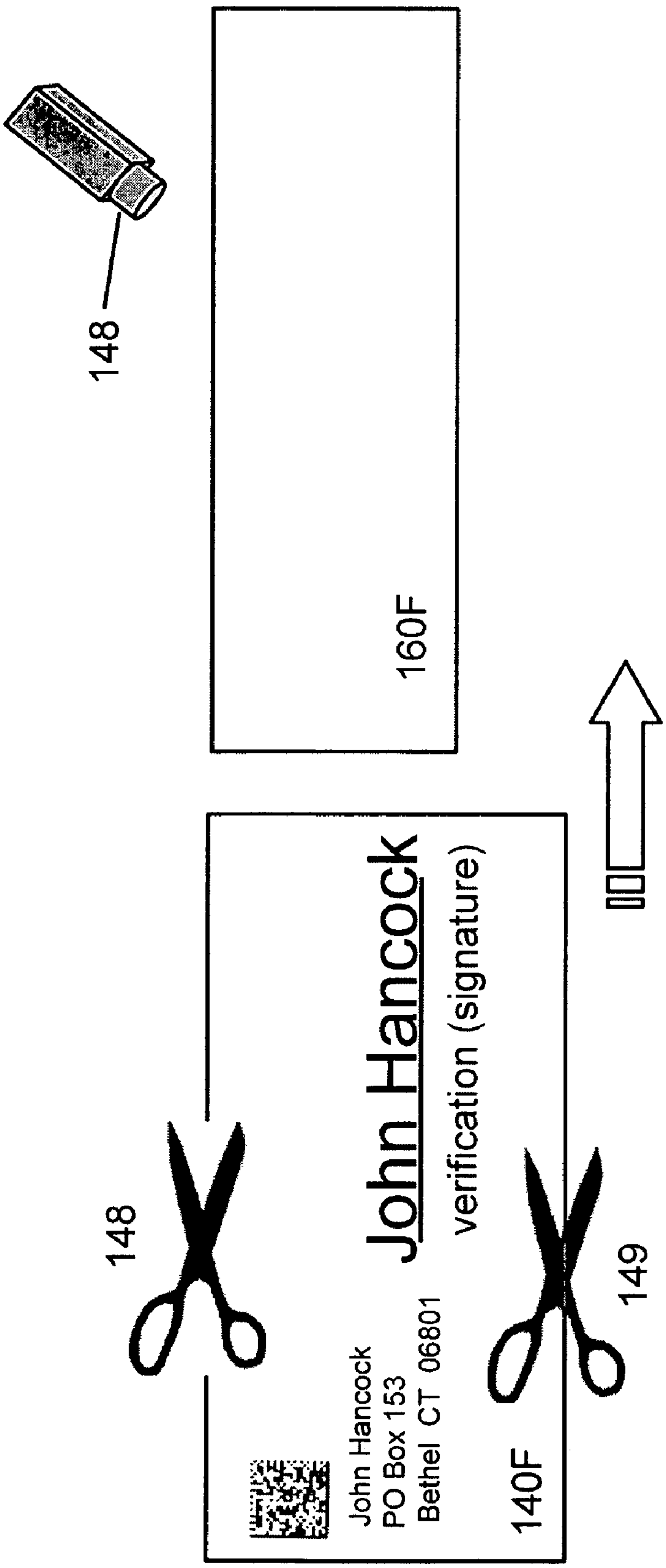
FIG. 6 is a diagrammatic representation of the process of removing the verification panel of the integrated sealed ballot and verification panel shown in FIG. 5 to access the sealed anonymous ballot.
Figure 7A:
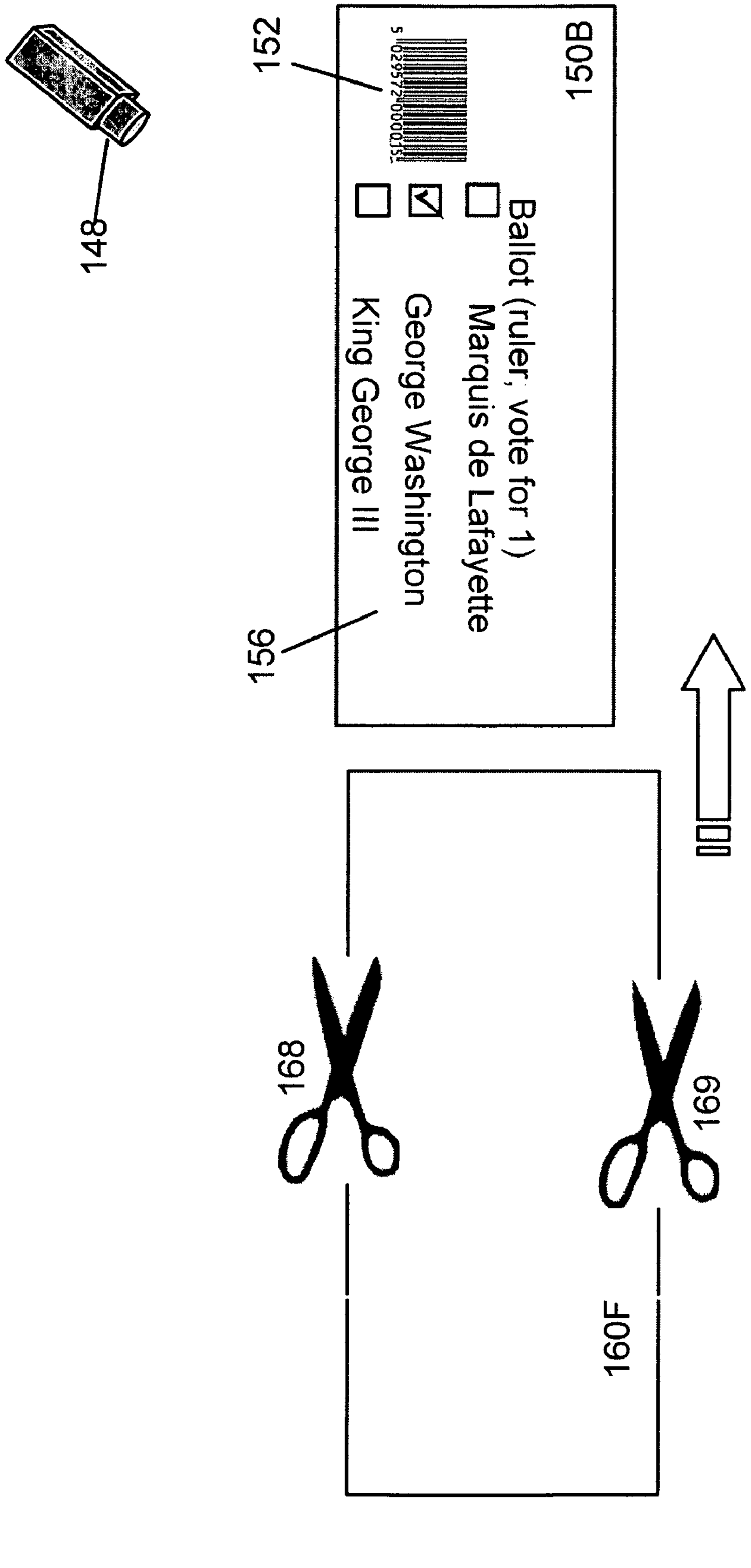
FIG. 7*a* is a diagrammatic representation of the process of opening the anonymous sealed ballot shown in FIG. 6 to reveal the upper ballot panel (150B) shown in FIG. 1*b;*
Figure 7B:
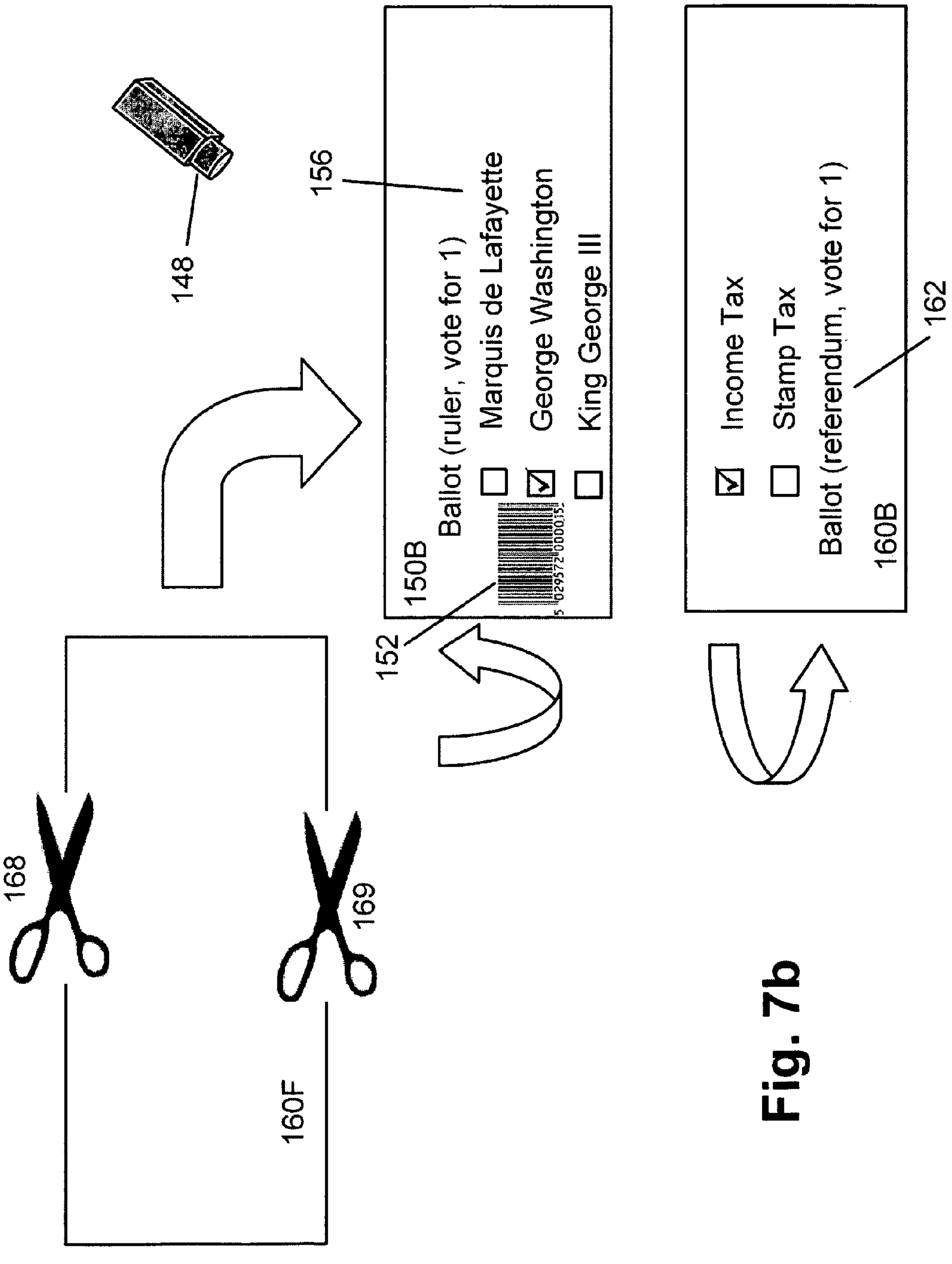
FIG. 7*b* is a diagrammatic representation of the process of opening the anonymous sealed ballot shown in FIG. 6 to reveal the upper ballot panel (150B) and the lower ballot panel (160B) shown in FIG. 1*b*, with the ballot panel shown in FIG. 7*a* flipped to orient the ballot panels in the same direction for processing.
Figure 7C:
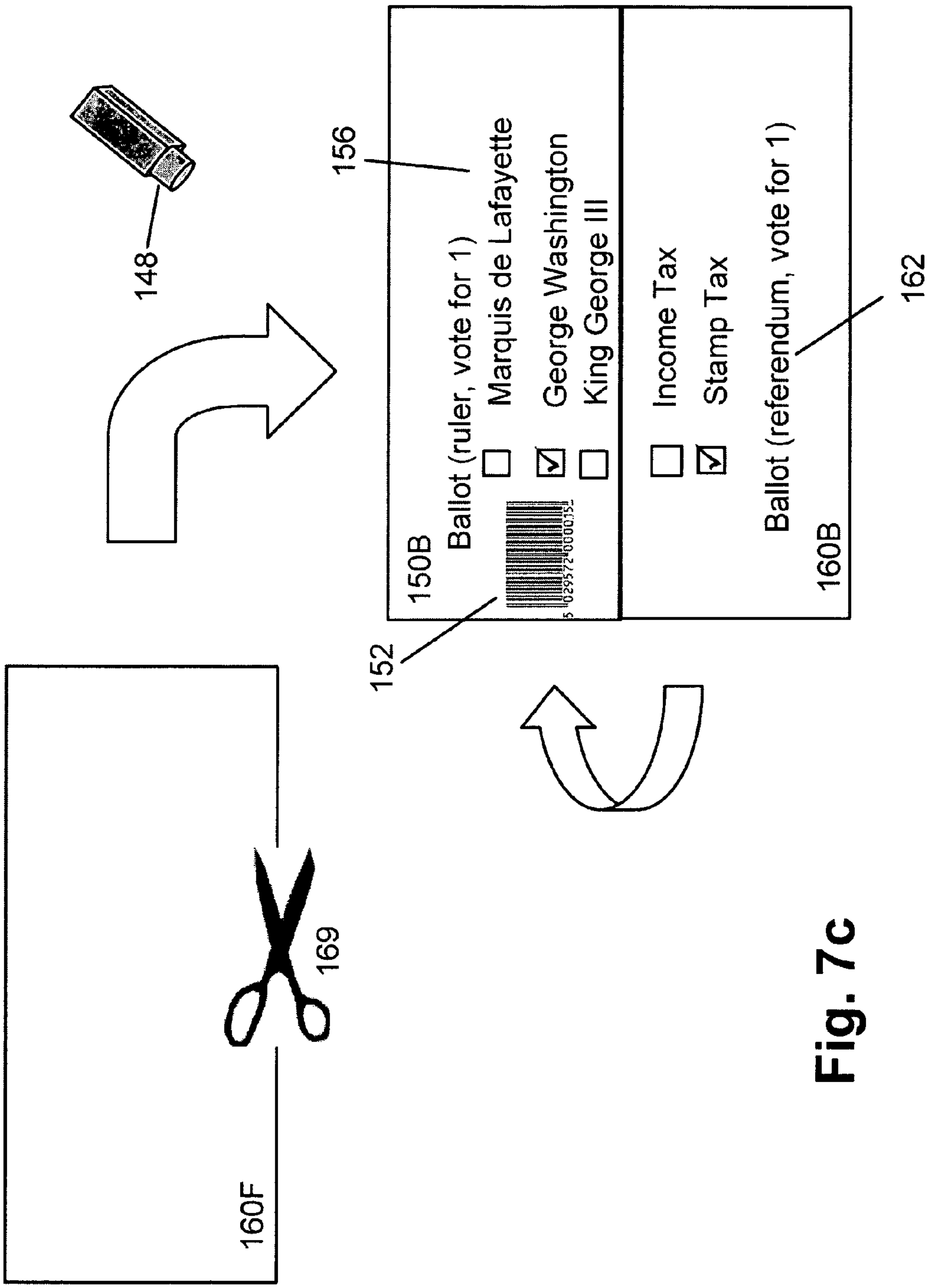
FIG. 7*c* is a diagrammatic representation of the process of opening the anonymous sealed ballot shown in FIG. 6 by opening on one side of the anonymous sealed ballot and unfolding to reveal the voter election and voting on the upper ballot panel (150B) and attached lower ballot panel (160B) shown in FIG. 1*b;*

As is shown in FIG. 6, the verification panel 140F is cut at the top and bottom by cutting devices 148 and 149, which can be in a similar manner to FIG. 5 although closer together. The cut verification panel 140 is removed, which also can be in a similar manner to the removal of the panel 120. The blank panel 130 may also be removed. This reveals the sealed ballot panel 160F. The ballot 150B and 160B remain sealed and secured, hidden from view. As is shown in FIG. 7*a*, the panel 160F is cut and removed in similar manner to FIG. 5 to expose the upper ballot panel 150B. Alternatively, the bottom panel of the ballot 160B, if it is employed in the voting process, may be cut and then one or both panels may be flipped, as is shown in FIG. 7*b*, for further processing. Since the ballots are anonymous, there is usually no requirement to retain ballot panel 150B integral with ballot panel 160B. Nevertheless, should such a requirement exist, the ballot would not be cut at the top and bottom as shown in FIG. 7*a*, but only along one edge where the glue line exists, which is the bottom of panel 160F as shown in FIG. 7*c*. The ballot panels can then be unfolded with ballot panel 150B retained integral with ballot panel 160B. The various referenced cutters (128/129; 148/149; and 168/169) would be separate and distinct cutters (with each pair positioned closer together) in a pipelined process if the ballot moved through multiple processing stations. Alternatively, the ballot might remain stationary with a pair of moveable cutters moving closer together for subsequent cut with a cutter 128 also providing the functionality of 148 and 168 while a cutter 129 provided the functionality of 149 and 169.

Figure 8:
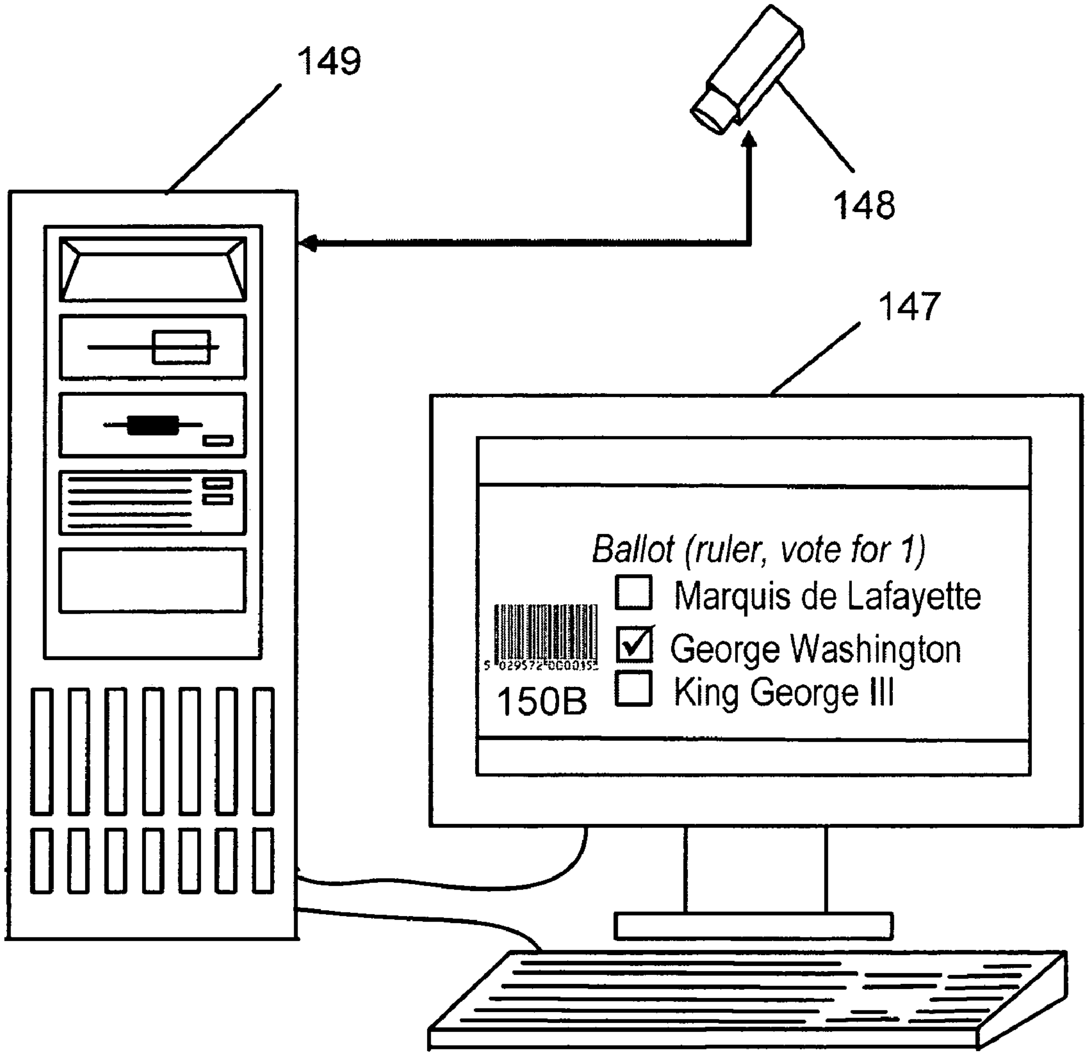
FIG. 8 is a representation of a computer system displaying a scanned and image flipped upper ballot panel (150B) on a computer monitor for ease of reading.

Reference is now made to FIG. 8. A computer 149 with computer monitor 147 may process the ballot panel 150B to reverse the image so that the image is oriented to facilitate being human-readable. Thus, the image of panel 150B as shown in FIG. 7*a* is flipped for ease in reading while the physical orientation of panel 150B itself is not changed. A similar type imaging operation may be employed in connection with ballot 160B, where the reverse side of the ballot is read by the camera system 148 to avoid changing the physical orientation of ballot panel 160B. The computer 149 receives the image from the camera system 148 and displays the ballot 150B on the computer monitor 147 in the proper orientation. Both ballot panels may be simultaneously or sequentially displayed on monitor 147 for processing.

Figure 9A:
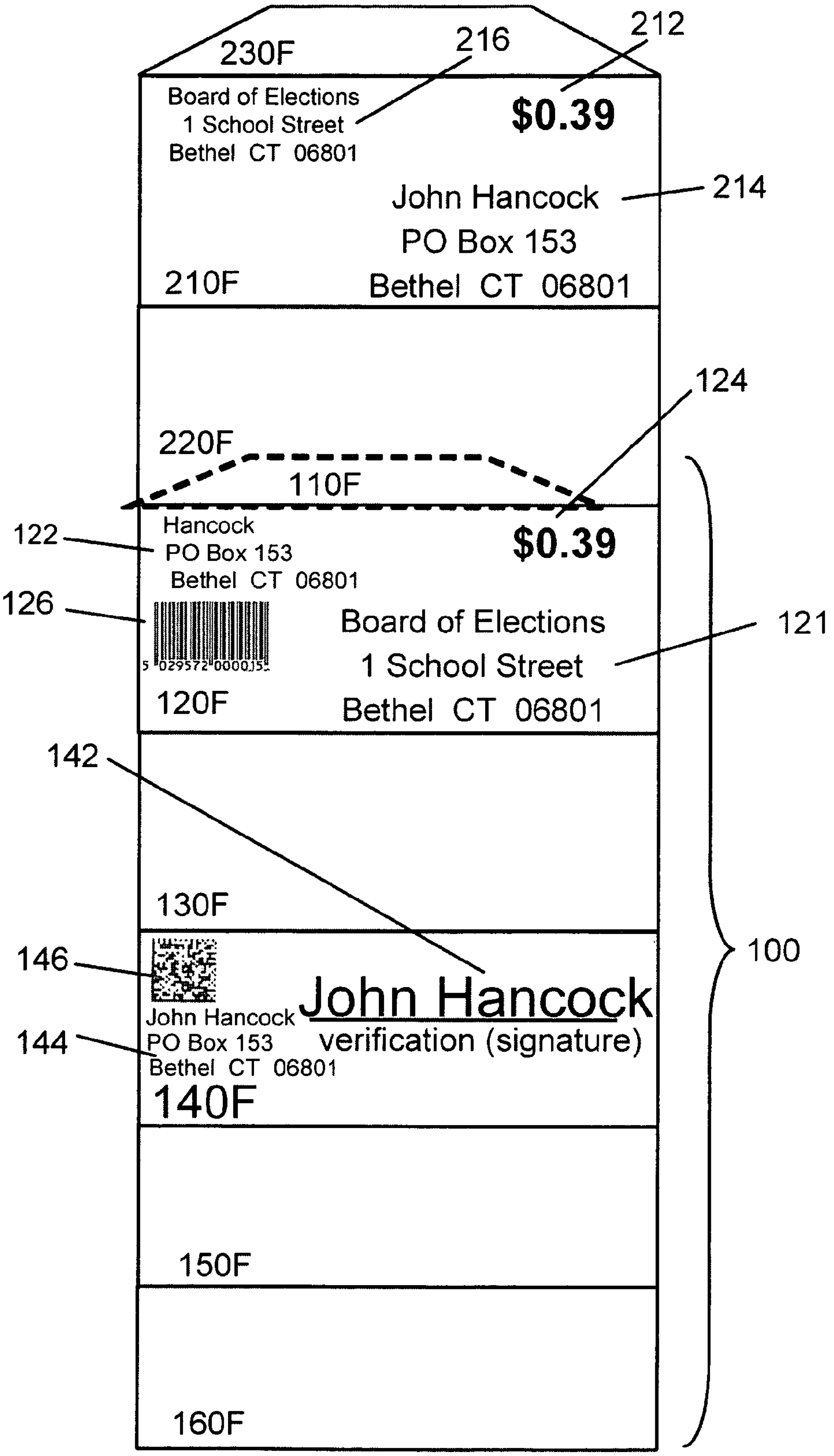
FIG. 9*a* is a front view of an integrated ballot and voting envelope with voter verification security shown in FIG. 1*a* including additional integrated panels which can be formed into an outer envelope for mailing by the voting authority to the voter.
Figure 9B:
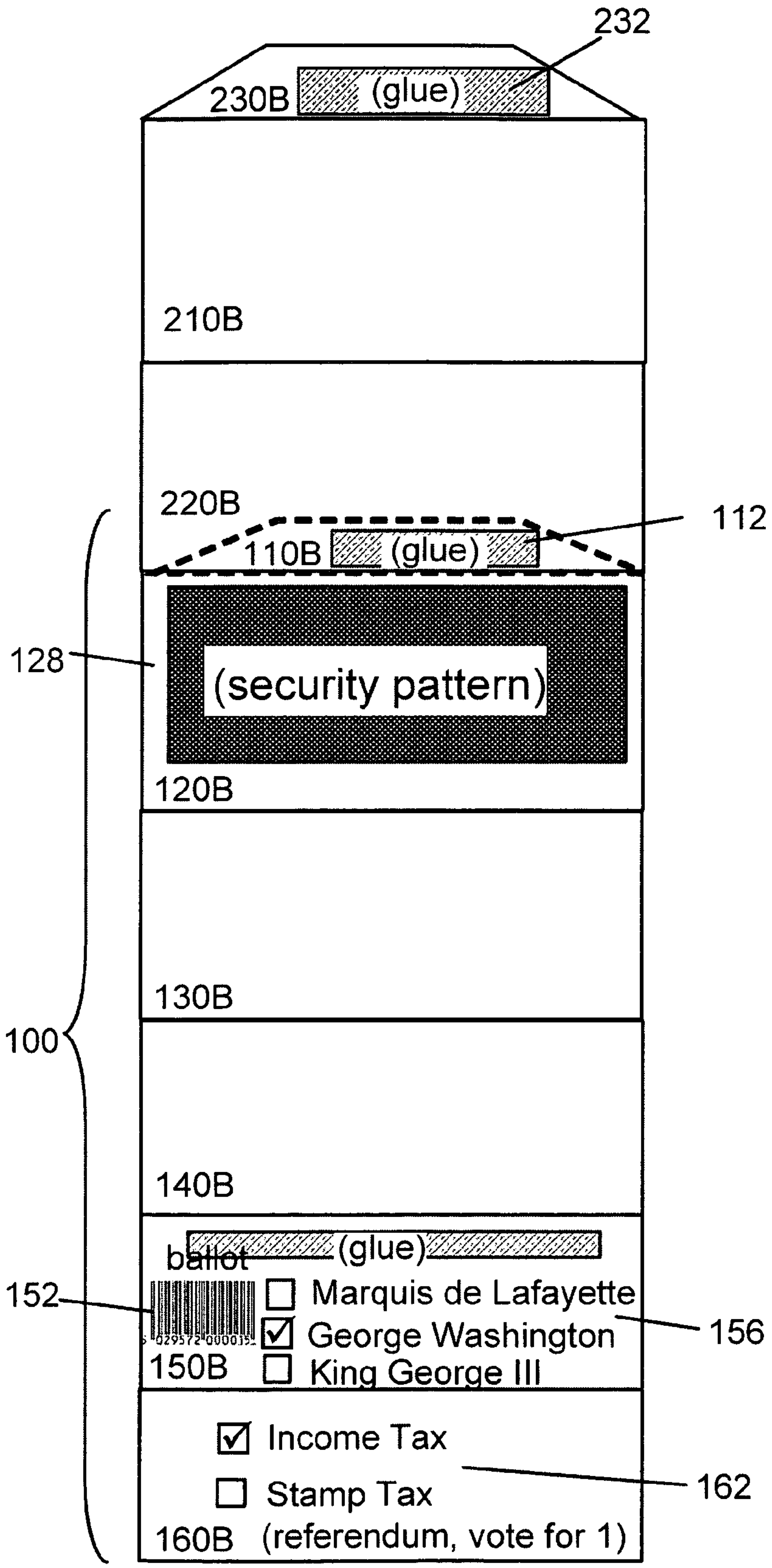
FIG. 9*b* is a back view of the integrated ballot and voting envelope with voter verification security shown in FIG. 1*b* including the additional integrated panels which can be formed into an outer envelope for mailing by the voting authority to the voter.

Reference is made to FIGS. 9*a* and 9*b*. The integrated voting system 100 includes two further panels 210 and 220 and flap 230. These additional panels enable the board of elections to mail the integrated voting system 100 to the voter. The panels 210F and 220F when roll folded form the outer mailing envelope for mailing the integrated voting system 100 to the voter with glue line 232 on flap 230B sealing the outer most mailing envelope. Thus, the panel 210F includes a postage block 212, an addressee block 214 directed to the voter and a return address block 216 directed to the voting authority, here the Board of Elections. The panel 220 is attached to the integrated ballot and voting envelope. The attachment may be by means of a perforated connection to the flap 110 to facilitate removal by the voter. When the panels 210 and 220 are removed, the integrated voting system 100 functions in the same manner as the integrated voting system 100 shown in FIGS. 1*a* and 1*b*.

Figure 10:
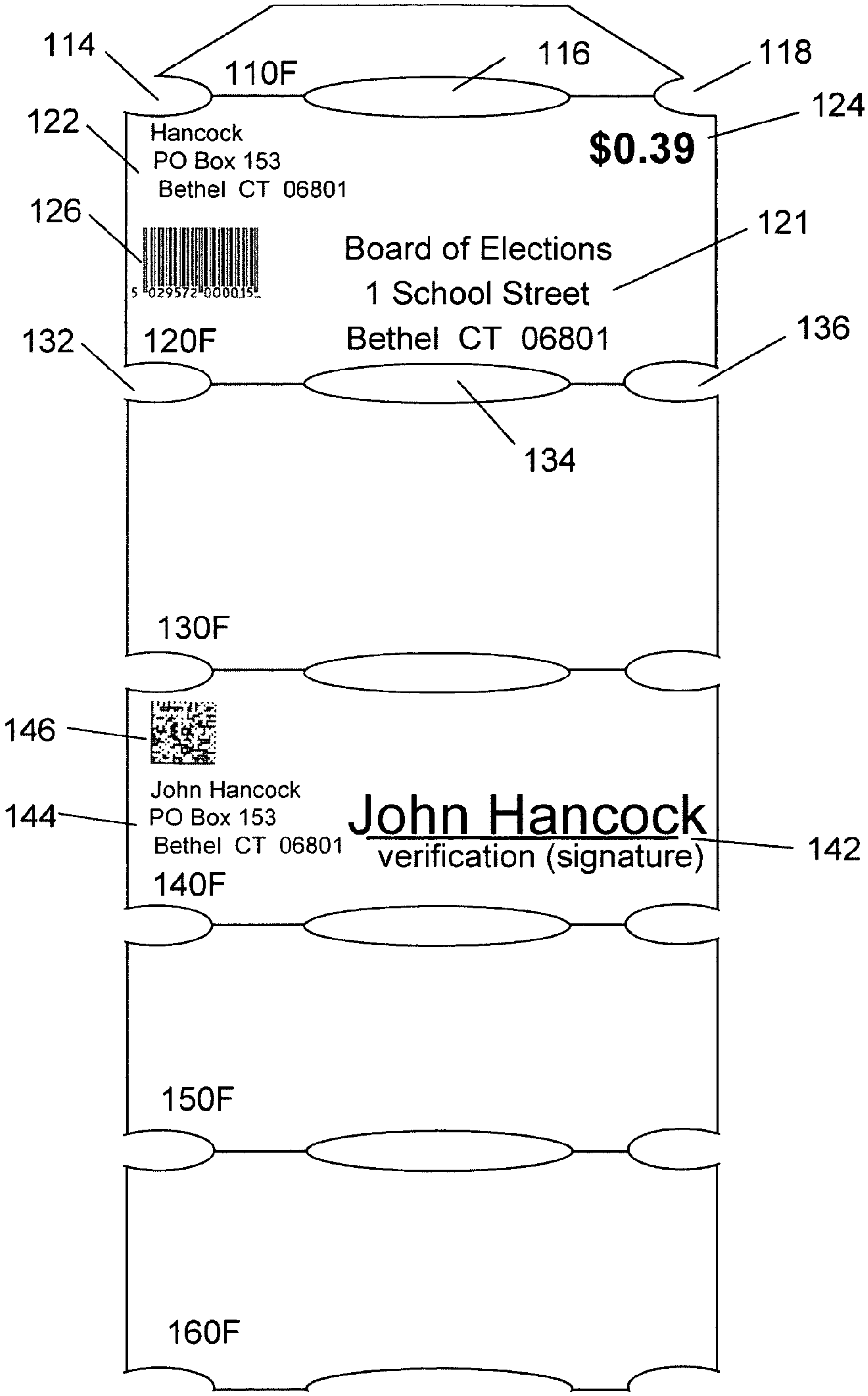
FIG. 10 is a front view of the integrated ballot and voting envelope with voter verification security shown in shown in FIGS. 1*a* and 1*b* having cut-aways on the fold lines to facilitate separation of the various panels during processing by voting authorities of the integrated ballot and voting envelope with voter verification security.

Reference is now made to FIG. 10. The integrated voting system 100 shown in FIG. 1*a* (and 1*b*, although the back is not shown here) has been modified to facilitate subsequent processing. The various fold lines that are to be cut during processing include either cut-outs as shown, or perforations or other means to provide weakening of the fold lines. This facilitates the separation of the various panels at a subsequent time when the integrated voting system 100 is processed. As shown in FIG. 10, various cut-outs are provided along the various fold lines where cutting or opening subsequently will occur. For example, the panel 120F includes cut-out portions on the top of the panel between panel 120F and flap 110F and also panel 130F, specifically, cut-outs 114,116, 118, 132, 134 and 136. In a like manner, the fold line weakening is provided between panels 130F and 140F and panel 150F and 160F.

Figure 11:
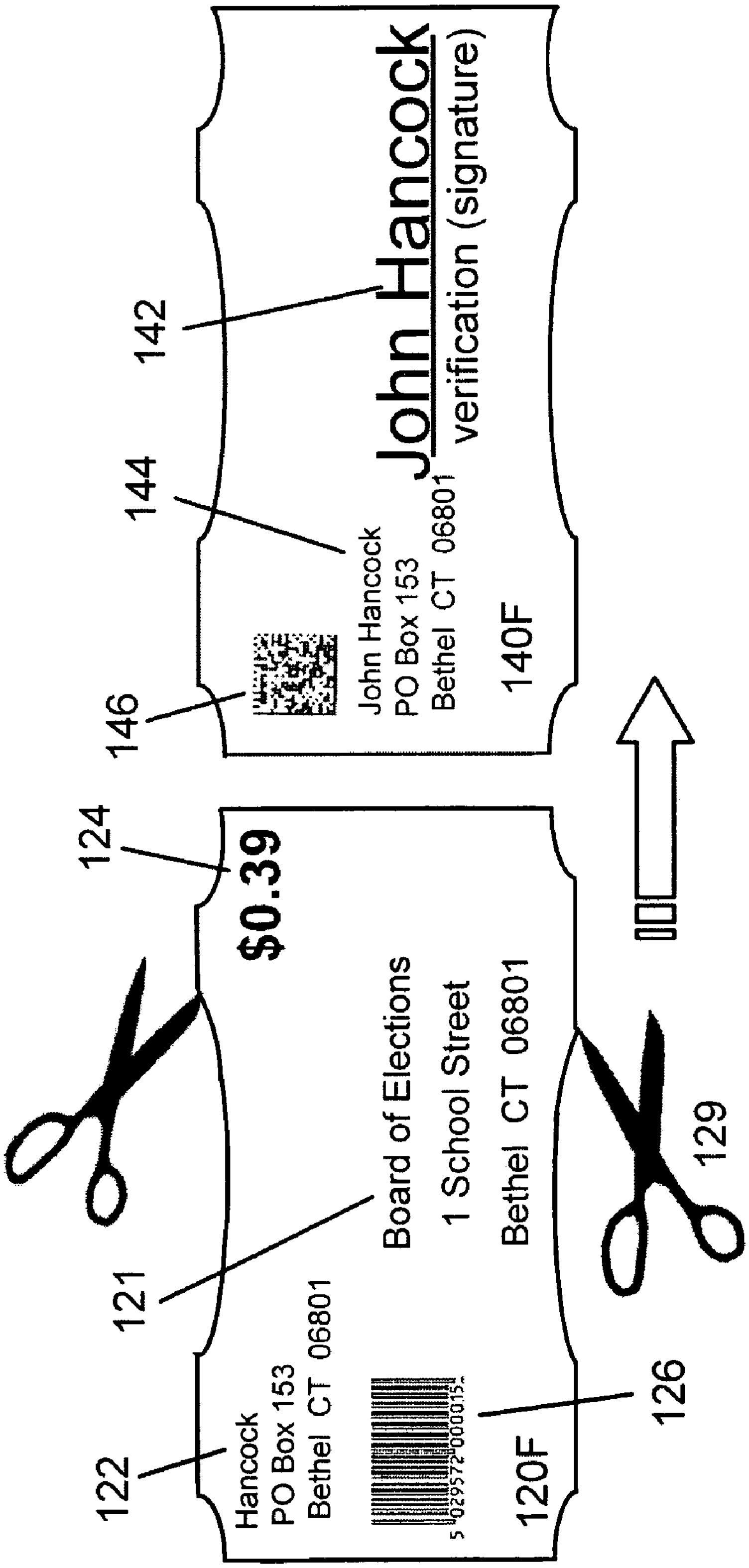
FIG. 11 is a diagrammatic representation of the process of opening the integrated ballot and voting envelope with voter verification security having cut-aways shown in FIG. 10 to expose the verification panel.

Reference is now made to FIG. 11, which demonstrates an example of the processing of the integrated voting system shown in FIG. 10. A smaller amount of material needs to be cut away by the cutting devices 128 and 129 to expose the verification panel 140F. The same applies to other panels to be cut.

Figure 12A:
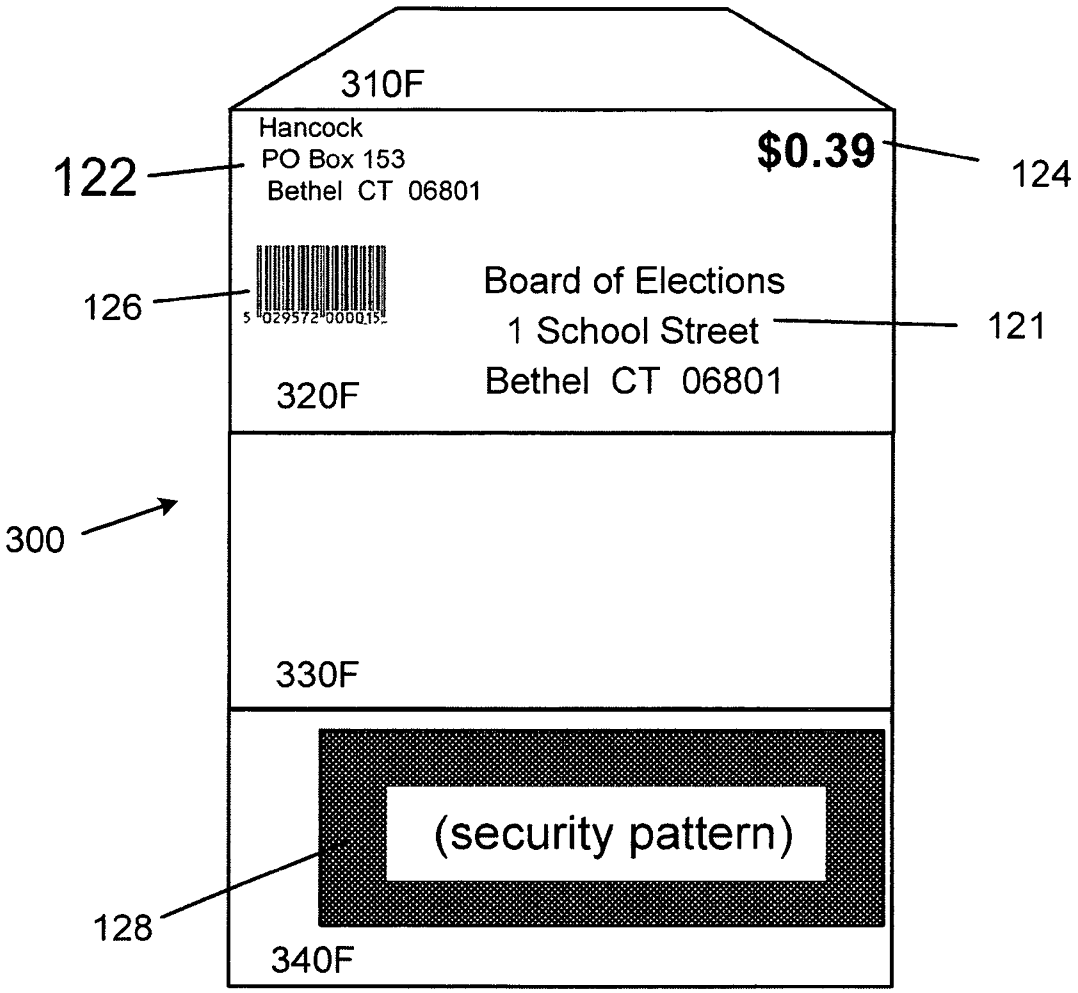
FIG. 12*a* is a front view of an arrangement of an integrated ballot and voting envelope with voter verification security embodying the present invention and reducing the number of panels involved in the ballot and voting envelope.
Figure 12B:
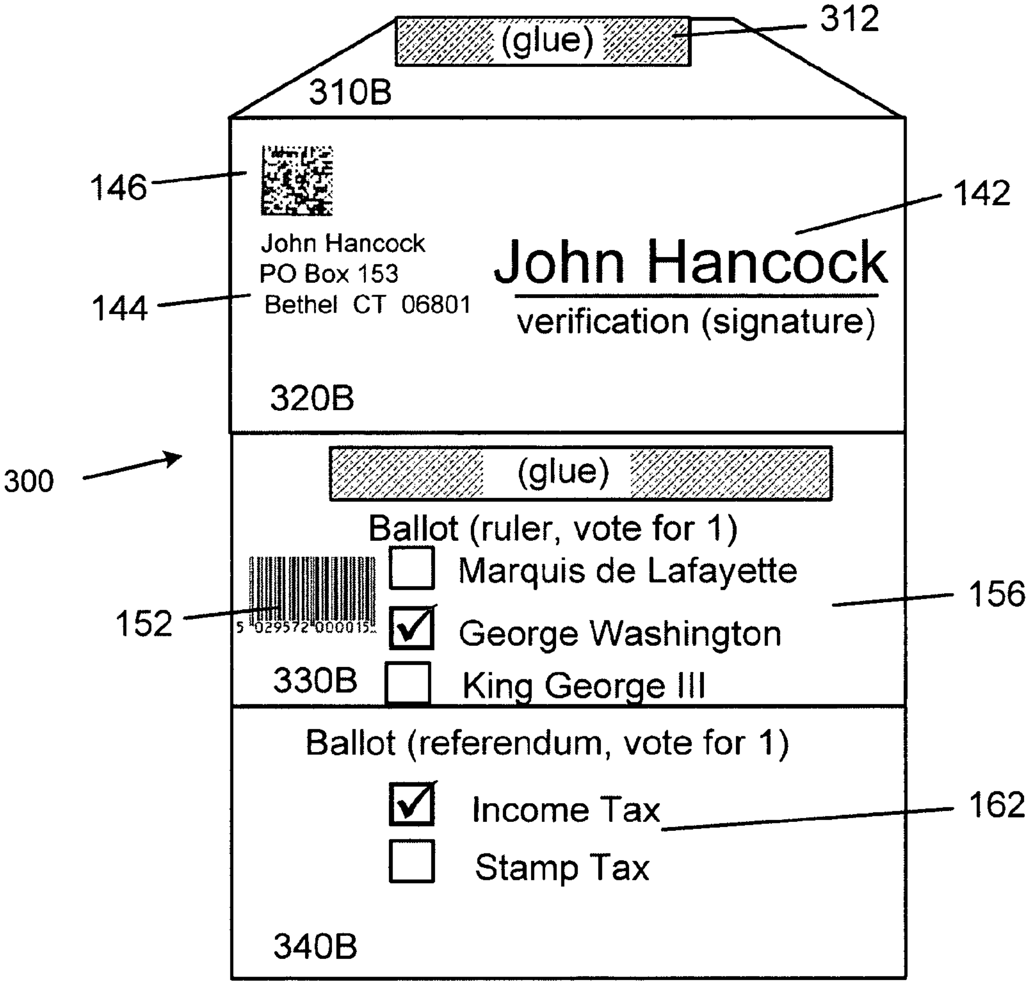
FIG. 12*b* is a back view of the integrated ballot and voting envelope with voter verification security reducing the number of panels involved in the ballot and voting envelope shown in FIG. 12*a;*
Figure 13:
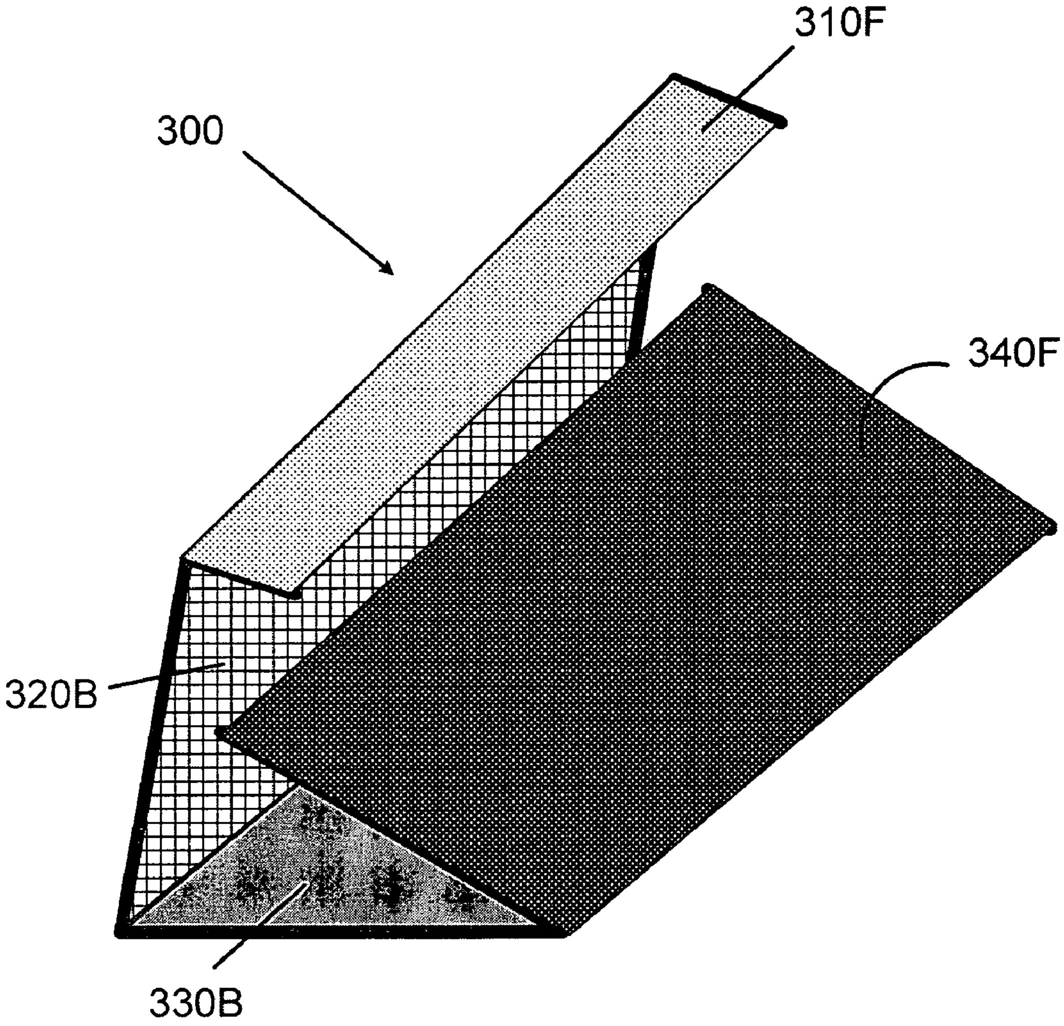
FIG. 13 is a perspective view of a partially roll-folded integrated ballot and voting envelope with voter verification security shown in FIGS. 12*a* and 12*b*

Reference is now made to FIGS. 12*a* and 12*b*, which is another embodiment of the integrated voting system 100 shown in FIGS. 1*a* and 1*b*. As shown in FIGS. 12*a* and 12*b*, four blank panels employed in FIGS. 1*a* and 1*b* have been removed. Specifically, panels 130B, 140B, 150F and 160F shown in FIGS. 1*a* and 1*b* are not present in the integrated ballot and voting envelope shown in FIG. 12*a* and 12*b*. Because of the removal of these panels, although the orientation of the ballots and verification panels may not be optimum for certain processing equipment, where the size of the ballot and availability of certain type of equipment dictate, ballots of these arrangements may be implemented. This saves on the size of the ballot and possibly the costs associated with printing, mailing and handling. The ballot includes a panel 320F containing similar information to panel 120F of FIG. 1*a*, an envelope back panel 330F and a security pattern panel 340F. The reverse side shown in FIG. 12*b* includes a verification panel 320B, an upper ballot panel 330B and a lower ballot panel 340B. The integrated voting system 300 when it is roll folded is shown in FIG. 13. As the integrated voting system 300 is folded, the flap 310 is positioned to have the glue portion on panel 310B seal to panel 330F.

Figure 14A:
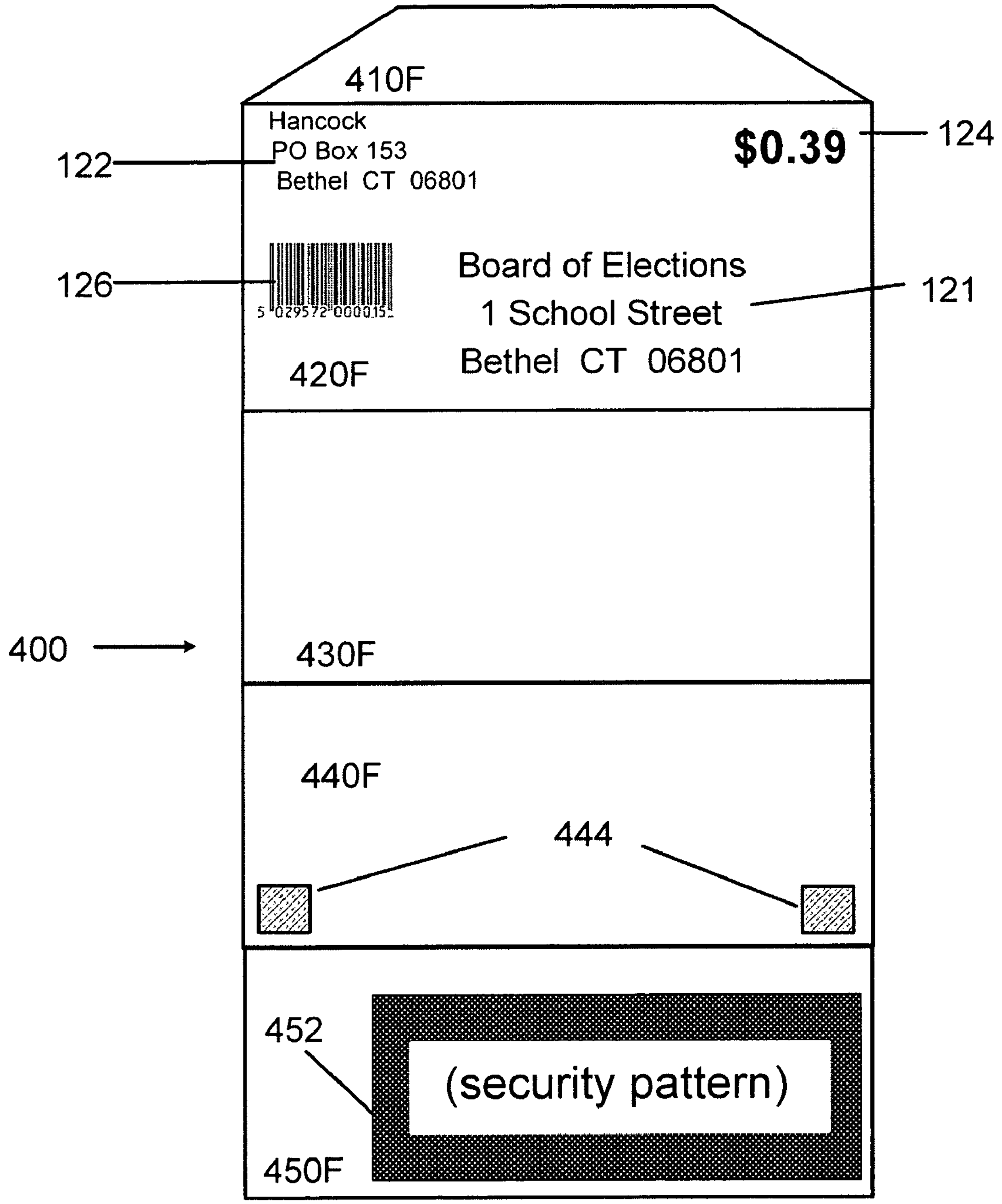
FIG. 14*a* is a front view of an arrangement of an integrated ballot and voting envelope with voter verification security embodying the present invention and suitable for Z-folded processing.
Figure 14B:
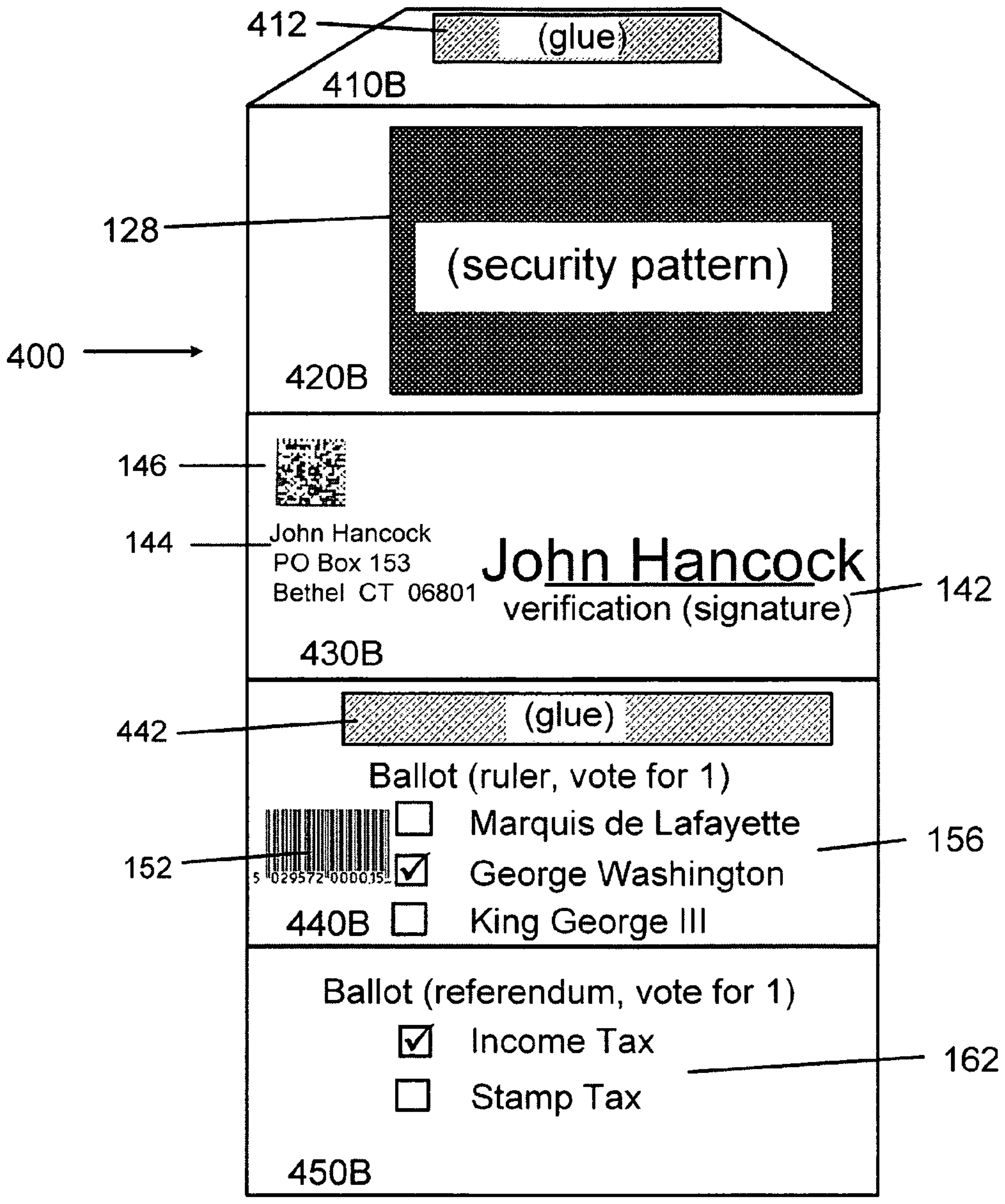
FIG. 14*b* is a back view of the integrated ballot and voting envelope with voter verification security shown in FIG. 14*a;*
Figure 15:
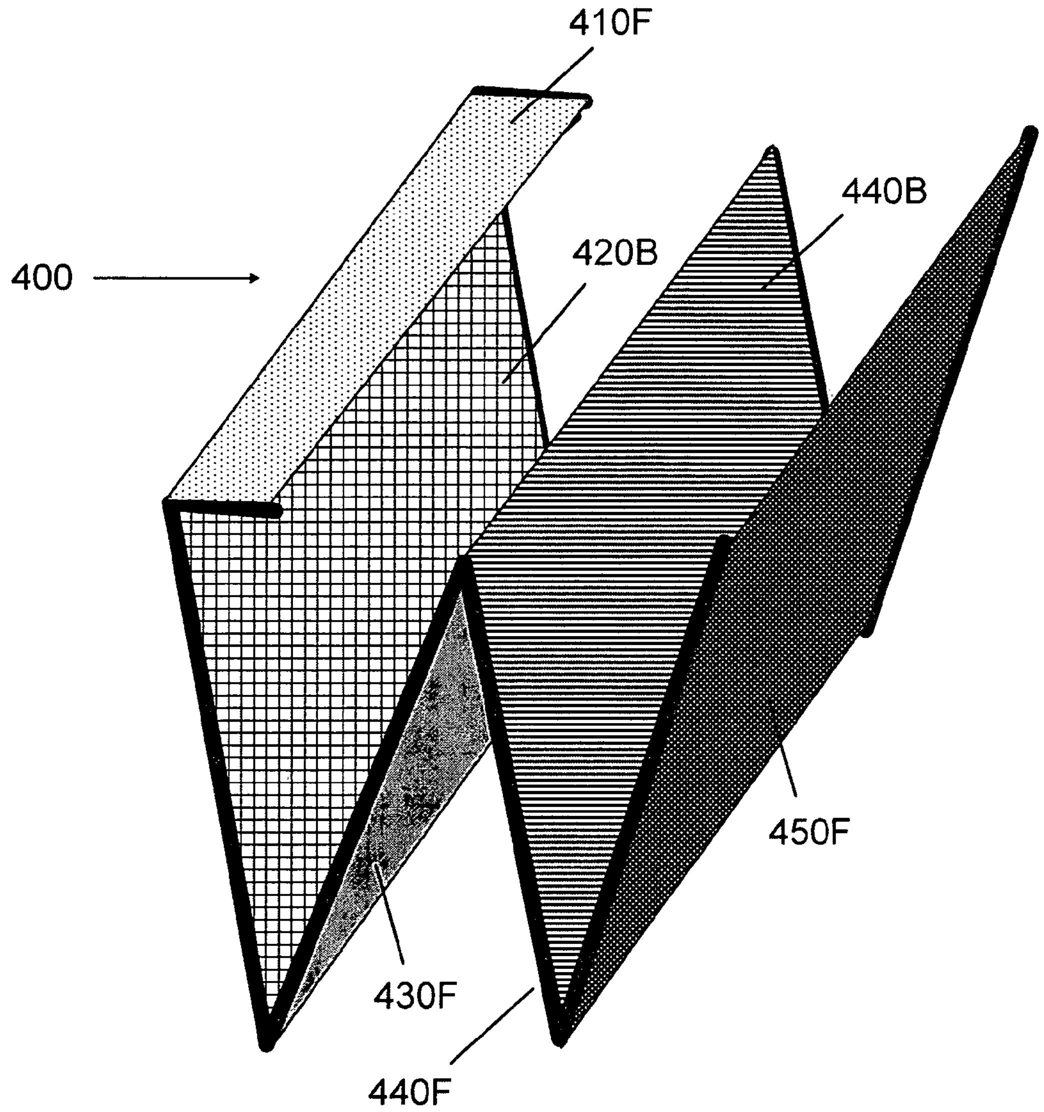
FIG. 15 is a perspective view of a partially Z-folded integrated ballot and voting envelope with voter verification security shown in FIGS. 14*a* and 14*b;*

Reference is now made to FIGS. 14*a* and 14*b*, which is a further embodiment of the integrated voting system adapted for Z-type folding. The integrated voting system 400 includes a flap 410 having a glue line 412 on panel 410B. An address panel 420F is provided having information similar to the address panel 120F of FIG. 1*a*. The panel 420B includes the security pattern 128 to provide similar functionality as is provided by the security pattern on panel 120B of FIG. 1*b*. A panel 430F is provided having the verification panel on the reverse side 430B. The ballot is provided on panels 440B and 450B and is adapted to be sealed by a glue line 442. The panel 440F includes glue patches 444, which glue to panel 430F adjacent the fold line between panel 430F and 420F. Ballot text placement would be positioned to ensure that vital information was not removed when the verification panel was separated from the ballot panels. Panel 450F, which is not adjacent to address panel 420F, is a second part of the voter mailing envelope when the integrated voting system form is Z-folded. A security pattern 452 is provided on panel 450F. This security pattern 452 provides additional security for the ballot 440B and 450B. FIG. 15 shows the Z-folded configuration of the integrated voting system 100 shown in FIGS. 14*a* and 14*b*.

Access to the verification panel and ballot by the Registrar of Voters for voter verification and ballot counting follows an approach similar to that described to the roll folded integrated voting system 100. Cutters at the top and bottom of the address panel 420 release the address panel and allow imaging of the smaller verification panel 430B within for voter verification. Likewise, a cutter at the fold between verification panel 430 and the ballot 440 breaks the continuous paper connection. Finally the other end of the verification panel may be released from the sealed closed ballot 440 and 450 by cutting away the corner glue spots 444 while leaving intact most of the paper connection between 440 and 450 to maintain the ballot integrity. Finally, after voter verification, the sealed ballot may be handed off to the tabulation (vote counting) operation which would cut away the glue line 442, open the ballot, and count the votes.

Figure 16A:
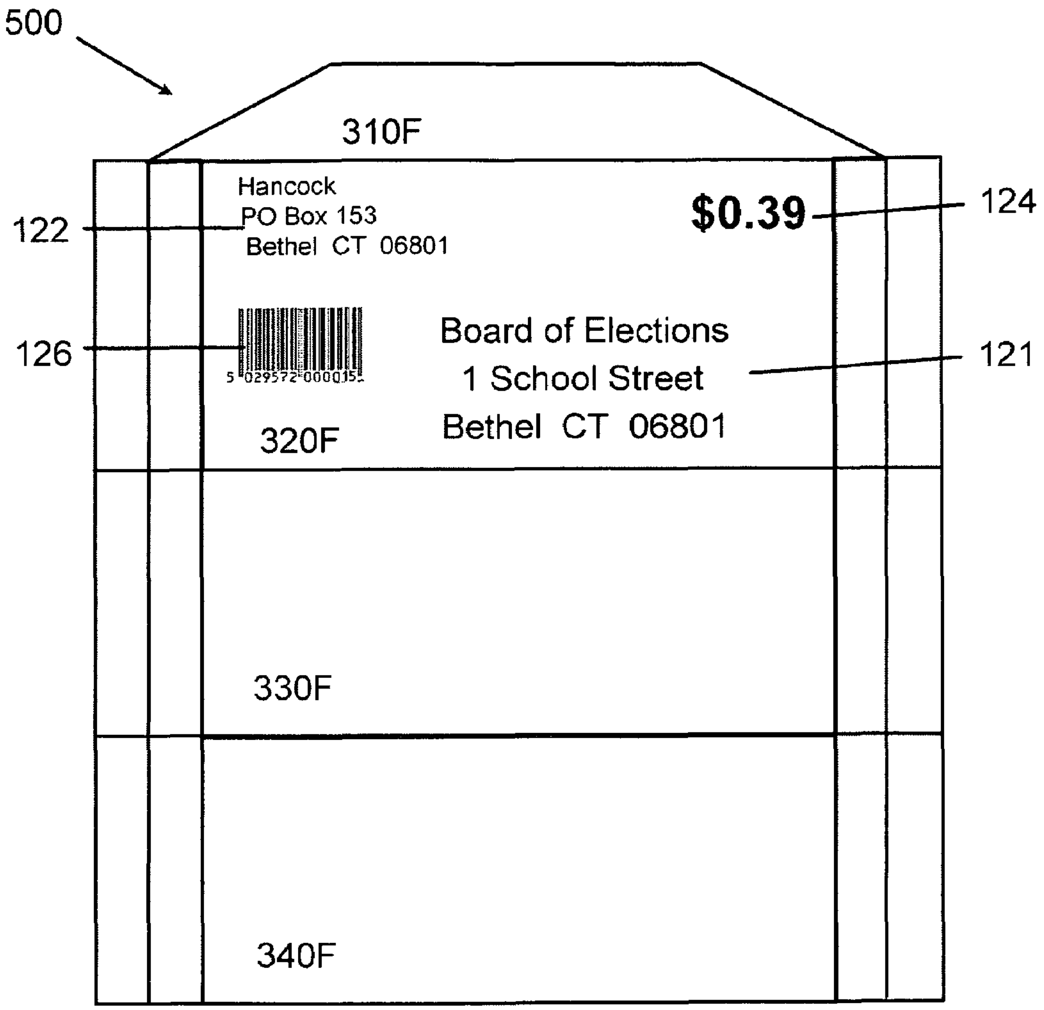
FIG. 16*a* is a front view of ballot and voter verification panel with privacy flaps for sealing the ballot and verification panel sides from viewing suitable for use as part of the integrated ballot and voting envelope with voter verification security.
Figure 16B:
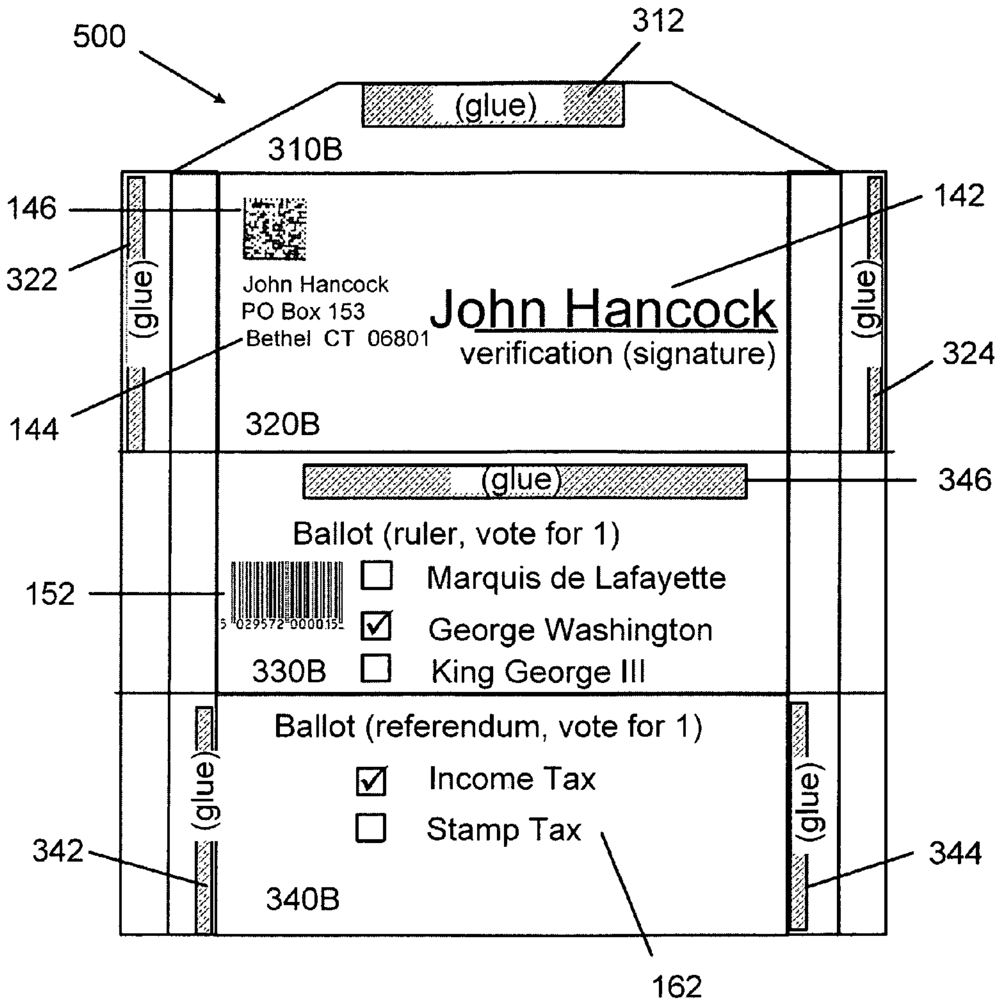
FIG. 16*b* is a back view of ballot and voter verification panels with glue lines for sealing the ballot and verification panel sides from viewing suitable for use as part of the integrated ballot and voting envelope with voter verification security shown in FIG. 16*a;*

Reference is now made to FIGS. 16*a* and 16*b* which show the smallest embodiments of the integrated voting system 100 and are adapted for simple roll folding. The back of the integrated voting system 500 includes a flap 310 having a glue line 312 on panel 310B. An address panel 320F is provided having information similar to panel 120F of FIG. 1*a*. A verification panel 320B is provided on the reverse side of address panel 320F (which already contains the return address of the voter). The ballot is provided on panels 330B and 340B and is adapted to be sealed by a glue line 346. Ballot text placement would be positioned to ensure that vital information was not removed when the verification panel was separated from the ballot panels.

The end security seals of the integrated voting system 500 are removed by cutting vertically just inside (closer to the envelope center) the 322 (left) and 324 (right) glue lines. This will release the ends of panel 320. Access to the verification panel and ballot by the Registrar of Voters for voter verification and ballot counting continues following an approach similar to that described to the roll folded integrated voting system 100. The end seals of the ballot are released by cutting vertically just inside (closer to the ballot) the 342 (left) and 344 (right) glue seals. Once the end seals are removed, cutters at the top and bottom of the address panel 320 release the address panel allowing imaging and voter verification of the back panel 320B. After voter authentication, a cutter above the glue line at the bottom of the 340F panel will unseal the folded ballot for unfolding and counting.

Figure 17A:
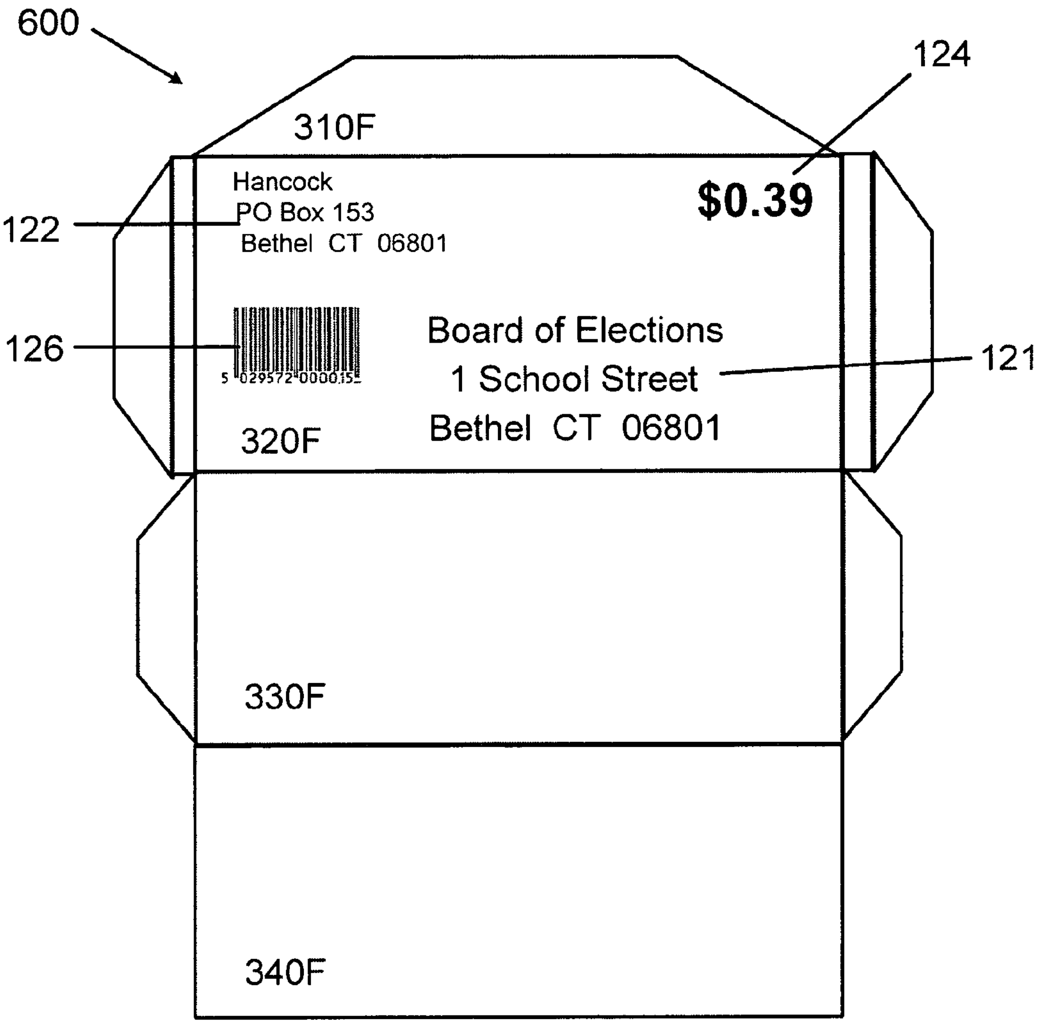
FIG. 17*a* is a front view of ballot and voter verification panel with privacy tabs for sealing the ballot and verification panel sides from viewing suitable for use as part of the integrated ballot and voting envelope with voter verification security.
Figure 17B:
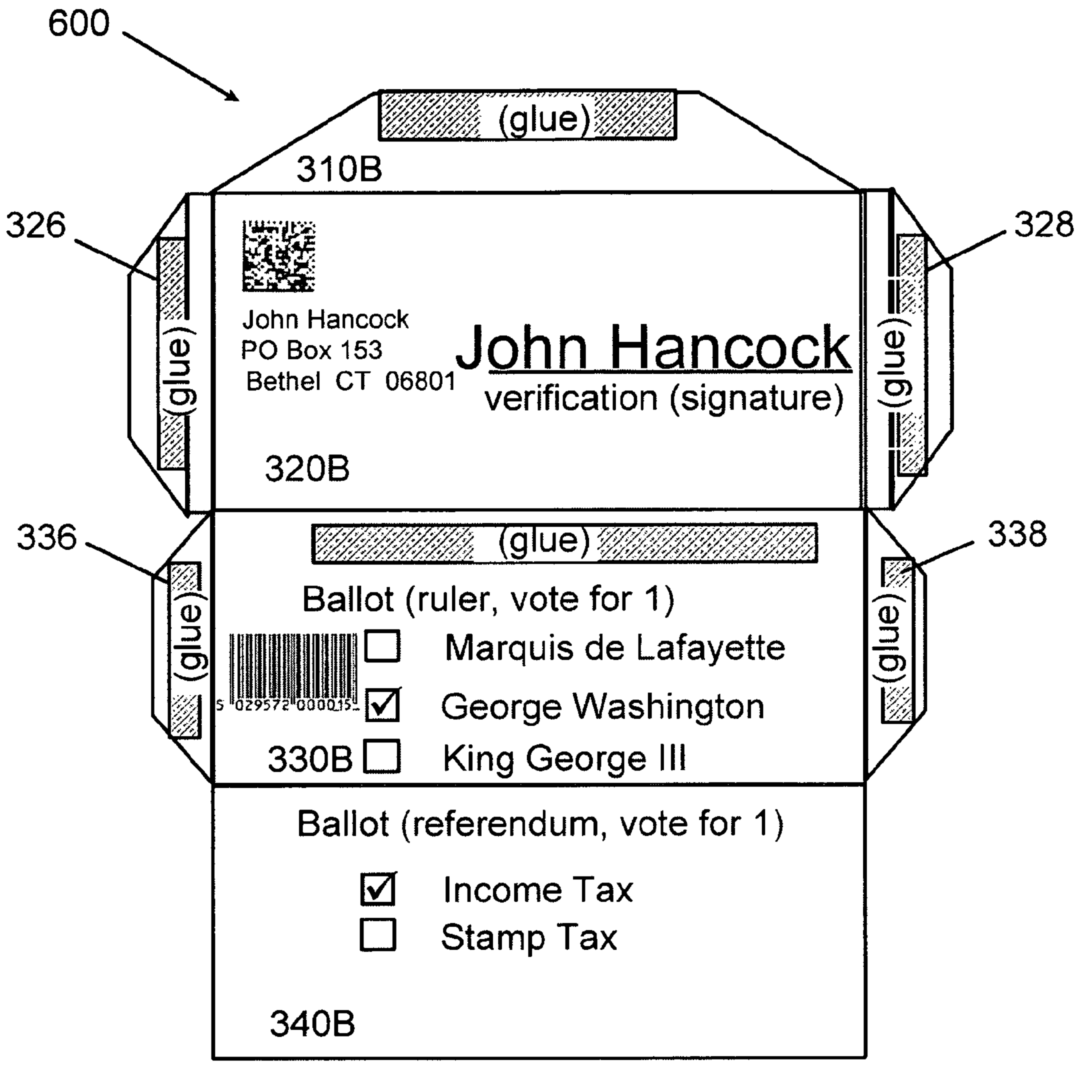
FIG. 17*b* is a back view of ballot and voter verification panels with glue lines for sealing the ballot and verification panel sides from viewing suitable for use as part of the integrated ballot and voting envelope with voter verification security shown in FIG. 16*a;*
Figure 18A:
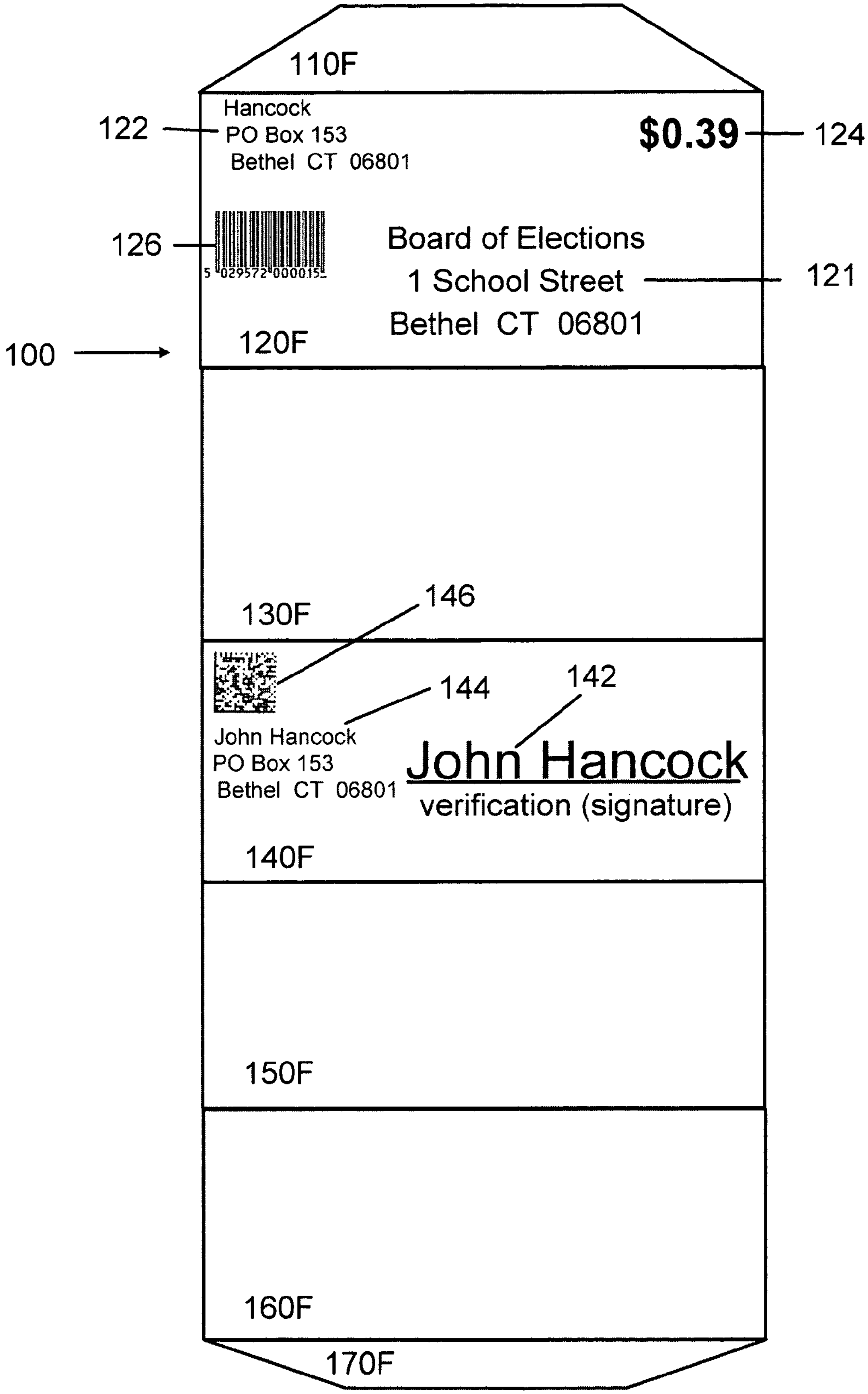
FIG. 18*a* is a front view of the integrated ballot and voting envelope with voter verification security shown in FIGS. 1*a* and 1*b* having a lower flap for sealing the ballot; and, FIG. 18*b* is a back view of the integrated ballot and voting envelope with voter verification security shown in FIG. 17*a* having a lower flap for sealing the ballot and showing the lower flap glue line.
Figure 18B:
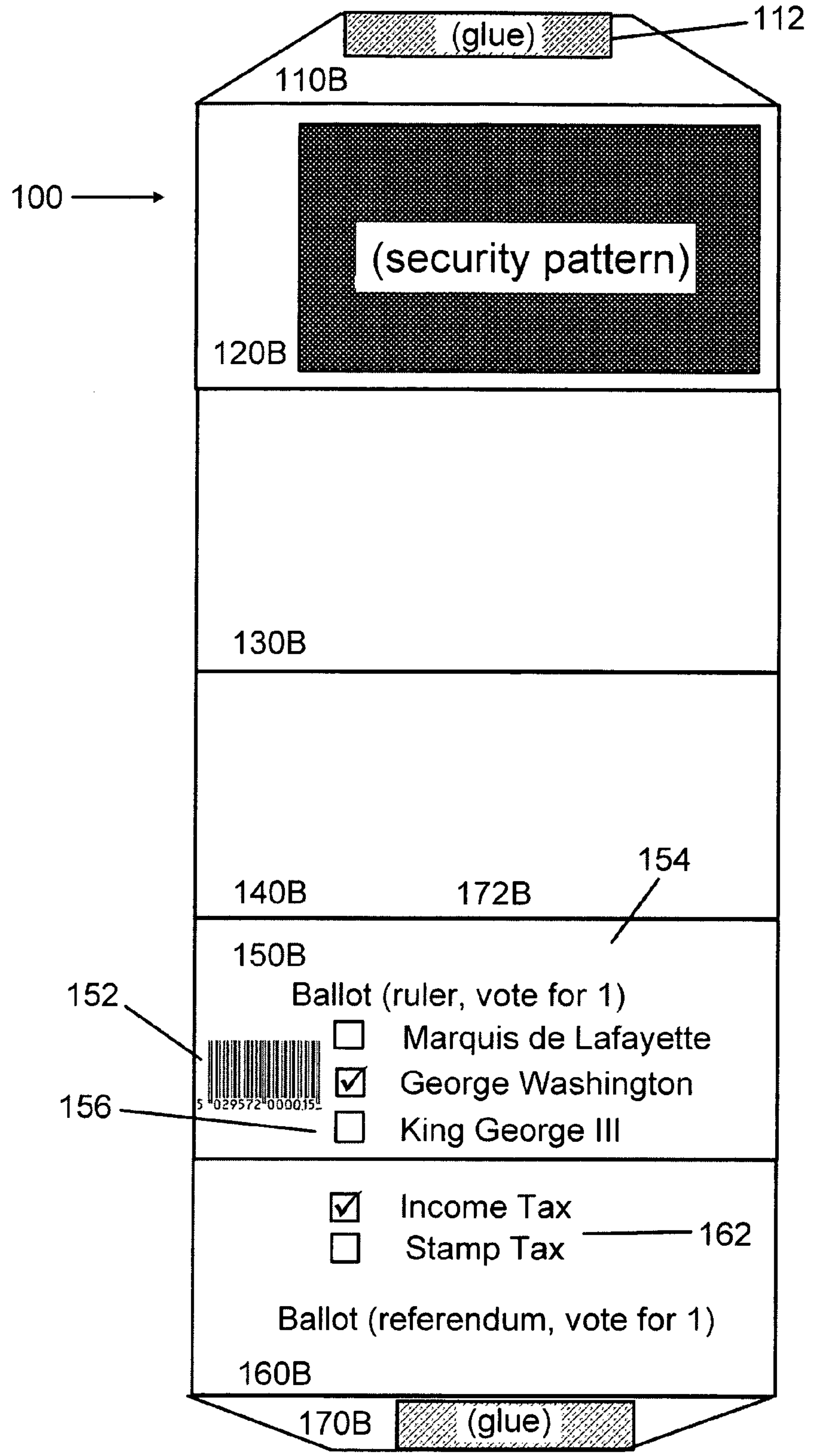

Various further modifications to enhance the security of the integrated voting system 100 can also be provided. Methods to seal edges of the folded integrated voting system 100 can be employed to preclude peeking into the ballot from the edges. These can include glue lines 322, 324, 342 and 344, such as shown in FIG. 16*b*, or foldable edge tabs, 326, 328, 336 and 328, as shown in FIGS. 17*a* and 17*b*. The edge tabs may also include glue lines. These edge glue lines and/or edge tabs would be cut away when the returned integrated voting system 100 is received by the voting authority and is processed. Where edge protection is provided for the integrated voting system 100, edge nesting can be provided such that the ballot panels and/or verification panels are not as wide as the other panels. This is similar to the different panel heights described in connections with FIGS. 1*a* and 1*b*. When the edge glue lines or tabs are cut away, the sealed ballot panels and sealed verification panel, along with its edge glue lines or tabs, are not damaged (FIG. 16*b* and 17*b*). As is shown in FIGS. 18*a* and 18*b*, a flap 170 can be incorporated with a glue line 172 on flap 170B at the bottom of the integrated voting system 100 shown in FIGS. 1*a* and 1*b*. When the ballot panels 150B and 160B are folded, the glued flap line 172 adheres to panel 140B at 172B so that there is less thickness to the glue line area when panels are processed for cutting. In the instance of the "Z" folded integrated ballot 400, this might also allow for a full length cut to release the glue spots 444 since three sides of the ballot would remain sealed.

It should be noted that in various embodiments of the integrated ballot and voting envelope the security patterns can be included on any blank panel to provide further enhanced security should that be desired. Additionally, while the integrated voting system may be provided to the voter in an unfolded or folded format. It may be desirable, however, for the voting authorities to fold integrated voting system even when provided to the voter in unfolded format because of the assistance provided to the voter in subsequently refolding the integrated voting system.

Various types of folds and combinations of folds are available in folding the integrated voting system 100. These folds include half-folds, C-folds, Z-folds, third-folds, cross-folds and the like. Various arrangements of the integrated voting system 100 may be provided to accommodate specific voting authority requirements, available equipment and the like which may require specific folding implementation. The various types and combinations of folds for the integrated voting system 100 may require appropriate modifications to the sealing means to provide the desired sealing or of panels. The glue may be a water activated glue, self-adhesive glue or other type suitable glue. Moreover, glue lines can be replaced with glue patches or glue points or other sealing or closing techniques which may remain protected with protective material until they are required for activation. Alternatively, two part glues may be utilized which do not stick to the raw paper but will stick to each other when they make contact.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

What is claimed is:

1. An integrated voting system form comprising:

a single sheet having ballot information, verification information and mailing information marked thereon, the single sheet having two sides, each side having information marks thereon, said sheet having folded panels including a first and a second panel having ballot said information thereon;

sealing means on one of the first and second panels, said sealing means located to obscure said ballot information from view when used seal said first and said second ballot panels;

a verification panel portion of the sheet is attached by a fold line to one of said first and said second ballot panels to provide for verification information; and, a first mailing panel portion of the sheet, said first mailing panel attached by a fold line to one of said first and said second ballot panels and said verification panel to form part of a voter mailing envelope for mailing said ballot panels and verification panel to a voting authority for processing.

2. An integrated voting system form as defined in claim 1 further including a second mailing panel, said second mailing panel attached by a fold line to said first mailing panel to form said voter mailing envelope.

3. An integrated voting system form as defined in claim 2 wherein said first and said second ballot panels are of a smaller height than said first and said second mailing panels.

4. An integrated voting system form as defined in claim 3 wherein said first and said second ballot panels are of a smaller height than said verification panel and said verification panel is of a smaller height than said first and said second mailing panels.

5. An integrated voting system form as defined in claim 4 wherein said sheet panels are roll-folded panels.

6. An integrated voting system form as defined in claim 4 wherein said ballot information is positioned on a first side of said sheet and said verification information and said mailing information are positioned on a second side of said sheet.

7. An integrated voting system form as defined in claim 4 wherein said fold line between one of said first and said second mailing panels and one of said first and said second ballot panels and said verification panel is a weakened fold line to facilitate separation of said verification panel and attached ballot panels from said mailing envelope.

8. An integrated voting system form as defined in claim 4 wherein said fold line between said verification panel and one of said first and said second ballot panels is a weaken fold line to facilitate separation of said verification panel from said first and said second ballot panels.

9. An integrated voting system form as defined in claim 4 further including a first and a second panel side sealing means for sealing said first and said second ballot panels sides to obscure said ballot information from view when used for sealing said first and said second ballot panels.

10. An integrated voting system form as defined in claim 4 wherein said first and said second panel side sealing means include a first and a second side privacy flap.

11. An integrated voting system form as defined in claim 4 including a security pattern on positioned on one of mailing envelope panels to help obscure information on said verification panel.

12. An integrated voting system form as defined in claim 4 including a code on said verification panel identifying a voter to be verified by information to be provided on said verification panel by said voter.

13. An integrated voting system form as defined in claim 4 including a code on one of mailing envelope panels to identify an election.

14. An integrated voting system form as defined in claim 13 including a code on one of said first and said second ballot panels to identify said election.

15. An integrated voting system form as defined in claim 2 including a third and a fourth mailing panel, one of said third and said fourth mailing panels attached by a fold line to one of said first and said second mailing panels to form a voting authority mailing envelope such that said ballot panels, verification panel and said voter mailing panels can be mailed by a voting authority to a voter.

16. An integrated voting system form as defined in claim 1 wherein a panel side is not adjacent to said first mailing panel forms another part of said voter mailing envelope and wherein said sheet panels are Z-folded panels.

17. A method of preparing an integrated voting system form comprising the steps of:

providing information on a single sheet, said information containing ballot information, verification information and mailing information, the single sheet having two sides and each side having information marked thereon;

folding said sheet to form a first and a second panel having ballot information thereon;

providing sealing means on one of said first and said second ballot panels positioned such that said ballot information on said first and said second ballot panels is obscured from view when said first and said second folded ballot panels are sealed by said sealing means;

folding said sheet to form a panel having verification information thereon attached by a fold line to one of said first and said second ballot panels to provide verification information; and, folding said sheet to form a first and a second mailing panel with one of said and said second mailing panels mailing panels attached by a fold line to one of said first and said second ballot panels and said verification panel such that said ballot panels and said verification panel can be mailed to a voting authority for processing.

18. A method of preparing an integrated voting system form as defined in claim 17 wherein said first and said second ballot panels are formed to be of a smaller height than said verification panel and said verification panel is formed to be of a smaller height than said first and said second mailing panels.

19. An integrated voting system form comprising:

a single sheet having a front side with verification information and mailing information thereon and a back side with ballot information thereon, said sheet having folded panels including a first and a second panel having ballot information thereon;

a glue line is on one of the first and second panels, said glue line located to obscure said ballot information from view when used seal said first and said second ballot panels;

a verification panel portion of the sheet is attached by a fold line to one of said first and said second ballot panels to provide for verification information relating to the ballot; and, a first and a second mailing panel portions of the sheet, one of said first and said second mailing panels attached by a fold line to one of said first and said second ballot panels and said verification panel to form a voter mailing envelope such that said ballot panels and verification panel can be mailed to a voting authority for processing.

20. An integrated voting system form as defined in claim 19 further including a first and a second panel side glue line for sealing said first and said second ballot panels sides to obscure said ballot information from view when used for sealing said first and said second ballot panels.

21. An integrated voting system form as defined in claim 20 wherein said first and said second panel side sealing means include a first and a second side privacy flap.

* * * * *